(12) United States Patent
Mockry et al.

(10) Patent No.: US 7,320,458 B2
(45) Date of Patent: Jan. 22, 2008

(54) HEATING TOWER APPARATUS AND METHOD WITH ISOLATION OF OUTLET AND INLET AIR

(75) Inventors: Eldon F. Mockry, Lenexa, KS (US); Jidong Yang, Overland Park, KS (US); Gregory P. Hentschel, Overland Park, KS (US); Jason Stratman, Lee's Summit, MO (US); Glenn S. Brenneke, Lee's Summit, MO (US); Darrin Ray Clubine, Kansas City, MO (US); James Douglas Randall, Kansas City, MO (US); Ohler L. Kinney, Jr., Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 48 days.

(21) Appl. No.: 11/181,863

(22) Filed: Jul. 15, 2005

(65) Prior Publication Data

US 2006/0060995 A1 Mar. 23, 2006

Related U.S. Application Data

(63) Continuation-in-part of application No. 10/942,940, filed on Sep. 17, 2004, now Pat. No. 7,137,623, and a continuation-in-part of application No. 10/942,939, filed on Sep. 17, 2004, now Pat. No. 7,137,619.

(51) Int. Cl.
*B01F 3/04* (2006.01)

(52) U.S. Cl. .................... 261/128; 261/140.1; 261/30; 165/164; 165/182

(58) Field of Classification Search ............... 261/128, 261/140.1, 141, 158, 28–30, DIG. 11; 165/164, 165/179, 182; 62/89, 406, 426, 427, 904
See application file for complete search history.

(56) References Cited

U.S. PATENT DOCUMENTS

| 3,034,315 | A | * | 5/1962 | Coblentz ...................... 62/272 |
| 3,035,760 | A | * | 5/1962 | Lovejoy ...................... 415/53.1 |
| 4,420,034 | A | * | 12/1983 | VanderVaart ................ 165/240 |
| 4,476,065 | A |   | 10/1984 | McKey |
| 4,549,405 | A | * | 10/1985 | Anderson et al. ............. 62/239 |
| 5,449,036 | A | * | 9/1995 | Genge et al. .......... 165/104.19 |
| 6,367,258 | B1 |  | 4/2002 | Wen et al. .................. 60/641.7 |
| 6,622,492 | B1 |  | 9/2003 | Eyermann .................. 62/50.2 |
| 6,644,041 | B1 |  | 11/2003 | Eyermann .................... 62/50.2 |
| 6,918,435 | B2 | * | 7/2005 | Dwyer ....................... 165/171 |
| 7,137,623 | B2 | * | 11/2006 | Mockry et al. ............. 261/128 |
| 2001/0011007 | A1 | * | 8/2001 | Akhtar et al. ................ 454/338 |
| 2005/0056042 | A1 | * | 3/2005 | Bourne et al. ................ 62/310 |

FOREIGN PATENT DOCUMENTS

| GB | 841089 | 7/1960 |
| JP | 09257279 | 9/1997 |

* cited by examiner

*Primary Examiner*—Scott Bushey
(74) *Attorney, Agent, or Firm*—Baker & Hostetler LLP

(57) ABSTRACT

A method for heating a fluid using a heating tower. The method includes the steps of drawing an air stream into the heating tower through an inlet and passing the air stream over a series of coils. The method for heating a fluid also includes discharging the air stream from the heating tower through an outlet and isolating the inlet air stream from the outlet air stream.

7 Claims, 17 Drawing Sheets

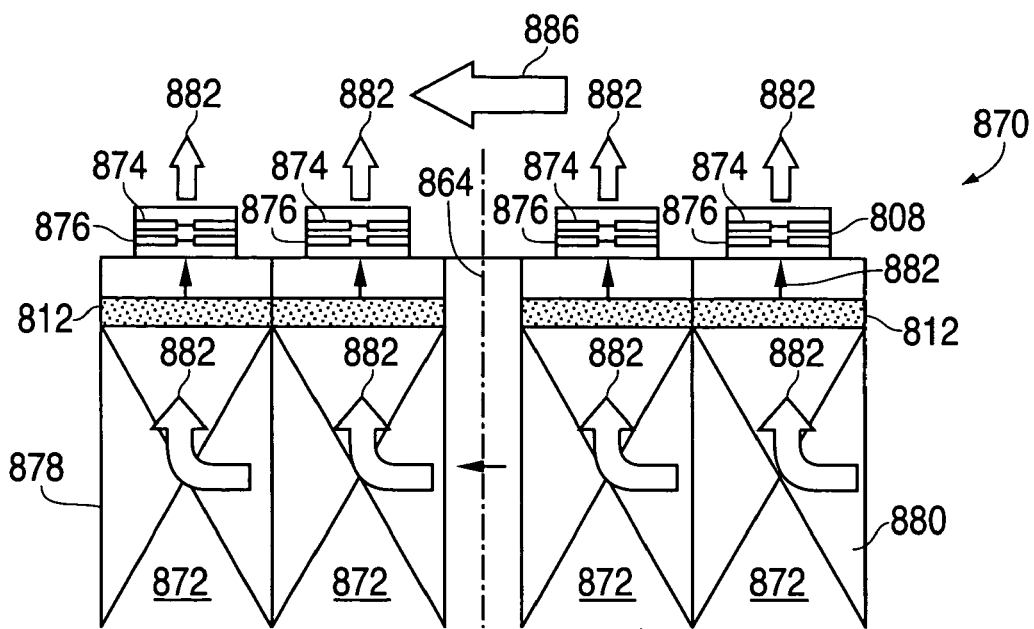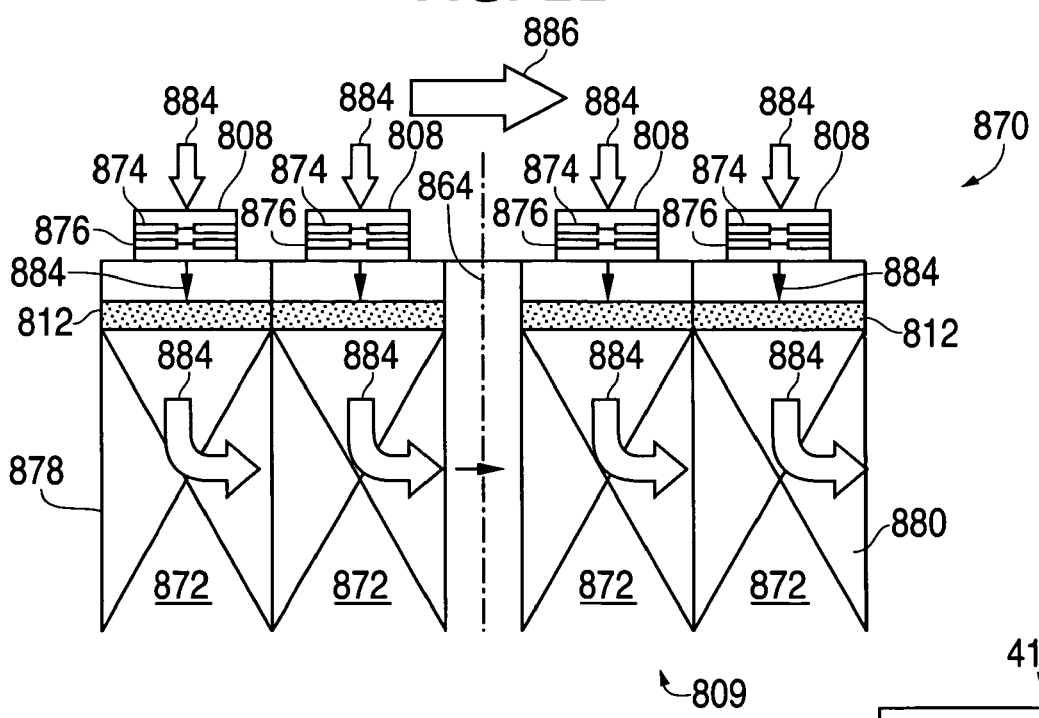

HEATING TOWER APPARATUS AND METHOD WITH ISOLATION OF OUTLET AND INLET AIR

PRIORITY

This application is a continuation-in-part, and claims the benefit of, U.S. patent application Ser. No. 10/942,940 filed Sep. 17, 2004, entitled HEATING TOWER APPARATUS AND METHOD WITH ISOLATION OF OUTLET AND INLET AIR now U.S. Pat. No. 7,137,623, and U.S. patent application Ser. No. 10/942,939 filed Sep. 17, 2004, entitled HEATING TOWER APPARATUS AND METHOD WITH WIND DIRECTION ADAPTATION now U.S. Pat. No. 7,137,619, each of the disclosures of which are incorporated herein by reference.

FIELD OF THE INVENTION

This invention relates generally to an apparatus and method for imparting heat to a circulating fluid by water heated by a heating tower apparatus. More particularly, the present invention relates, for example, to an apparatus and method whereby liquefied natural gas or the like, is vaporized via heat exchange.

BACKGROUND OF THE INVENTION

There are times when it is desirable to impart heat from ambient air to a relatively cool liquid to "heat" the liquid. This circumstance can arrive with respect to liquefied natural gas.

The cryogenic liquefaction of natural gas is routinely practiced as a means for converting natural gas into a more convenient form for transportation. Such liquefaction typically reduces the volume by about 600 fold and results in an end product that can be stored and transported more easily. Also, it is desirable to store excess natural gas so that it may be easily and efficiently supplied when the demand for natural gas increases. One practical means for transporting natural gas and also for storing excess natural gas, is to convert the natural gas to a liquefied state for storage and/or transportation and then vaporize the liquid as demand requires.

Natural gas often is available in areas remote from where it will ultimately be used, therefore the liquefaction of natural gas is even of greater importance. Typically, natural gas is transported via pipeline from the supply source directly to the user market. However, it has become more common that the natural gas be transported from a supply source which is separated by great distances from the user market, where a pipeline is either not available or is impractical. This is particularly true of marine transportation where transport must be made by ocean-going vessels. Ship transportation of natural gas in the gaseous state is generally not practical because of the great volume of the gas in the gaseous state, and because appreciable pressurization is required to significantly reduce the volume of the gas. Therefore, in order to store and transport natural gas, the volume of the gas is typically reduced by cooling the gas to approximately −240° F. to approximately −260° F. At this temperature, the natural gas is converted into liquefied natural gas (LNG), which possesses near atmospheric vapor pressure. Upon completion of transportation and/or storage of the LNG, the LNG must be returned to the gaseous state prior to providing the natural gas to the end user for consumption.

Typically, the re-gasification or vaporization of LNG is achieved through the employment of various heat transfer fluids, systems and processes. For example, some processes used in the art utilize evaporators that employ hot water or steam to heat the LNG to vaporize it. These heating processes have drawbacks however because the hot water or steam oftentimes freezes due to the extreme cold temperatures of the LNG which in turn causes the evaporators to clog. In order to overcome this drawback, alternative evaporators are presently used in the art, such as open rack evaporators, intermediate fluid evaporators and submerged combustion evaporators.

Open rack evaporators typically use sea water or like as a heat source for countercurrent heat exchange with LNG. Similar to the evaporators mentioned above, open rack evaporators tend to "ice up" on the evaporator surface, causing increased resistance to heat transfer. Therefore, open rack evaporators must be designed having evaporators with increased heat transfer area, which entails a higher equipment cost and increased foot print of the evaporator.

Instead of vaporizing LNG by direct heating by water or steam, as described above, evaporators of the intermediate type employ an intermediate fluid or refrigerant such as propane, fluorinated hydrocarbons or the like, having a low freezing point. The refrigerant can be heated with hot water or steam, and then the heated refrigerant or refrigerant mixture is passed through the evaporator and used to vaporize the LNG. Evaporators of this type overcome the icing and freezing episodes that are common in the previously described evaporators, however these intermediate fluid evaporators require a means for heating the refrigerant, such as a boiler or heater. These types of evaporators also have drawbacks because they are very costly to operate due to the fuel consumption of the heating means used to heat the refrigerant.

One practice currently employed in the art to overcome the high cost of operating boilers or heaters is the use of water towers, by themselves or in combination with the heaters or boilers, to heat the refrigerant that acts to vaporize the LNG. In these systems, water is passed into a water tower wherein the temperature of the water is elevated. The elevated temperature water is then used to heat the refrigerant such as glycol via a first evaporator, which in turn is used to vaporize the LNG via a second evaporator. These systems also have drawbacks however in terms of the buoyancy differential between the tower inlet stream and the tower outlet stream. The heating towers discharge large quantities of cold moist air or effluent that is very heavy compared to the ambient air. Once the cold effluent is discharged from the tower, it tends to want to sink or travel to ground because it is so much heavier than the ambient air. The cold effluent is then drawn into the water tower, hindering the heat exchange properties of the tower and causing tower to be inefficient. The aforementioned buoyancy problem causes the recirculation of cold air through water towers, hindering their ability to heat the water and essentially limiting the effectiveness of the towers.

Accordingly, there is a need in the art to provide an improved apparatus and method for imparting heat to a circulating fluid by a heating tower apparatus. It is desirable to have such apparatus and method to accomplish the vaporization of LNG that in a efficient and cost effective manner. Furthermore, there is a need in the art to provide a heating tower for use in the LNG vaporization process and/or in a vaporization system that enables the process and/or system to effectively heat water and enable the process to be more efficient and cost effective.

SUMMARY OF THE INVENTION

The foregoing needs are met, to a great extent, by the present invention, wherein aspects of a heating tower apparatus and method are provided.

In accordance with one embodiment of the present invention, a method for heating a fluid using a heating tower is provided, comprising the steps of: drawing an air stream into the heating tower through an inlet; passing the air stream over a fill medium; passing the fluid over the fill medium; discharging the air steam from the heating tower through an outlet; and isolating the inlet air stream from the outlet air stream.

In accordance with another embodiment of the present invention, a heating tower apparatus for heating a liquid is provided having an air flow inlet that provides an inlet air flow stream. The inlet includes an inlet duct. The heating tower also includes an air flow outlet that provides an outlet air flow stream. The inlet duct operates to isolate the inlet air flow stream for the outlet air flow stream. The heating tower further includes at least one heating tower cell connected to the inlet duct and the outlet. The heating tower cell comprises a liquid distribution assembly along with a fill medium, wherein the liquid distribution assembly distributes liquid onto the fill medium.

In accordance with yet another embodiment of the present invention, a heating tower apparatus for heating a liquid is provided having an air flow inlet that provides an inlet air flow stream. The heating tower also includes an air flow outlet having an outlet duct that provides an outlet air flow stream. The outlet duct operates to isolate the inlet air flow stream for the outlet air flow stream. The heating tower further includes at least one heating tower cell connected to the inlet and the outlet duct. The heating tower cell comprises a liquid distribution assembly along with a fill medium, wherein the liquid distribution assembly distributes liquid onto the fill medium.

In accordance with still another embodiment of the present invention, a heating tower apparatus for heating a liquid is provided having an air flow inlet that provides an inlet air flow stream and an air flow outlet that provides an outlet air flow stream. The inlet duct operates to isolate the inlet air flow stream for the outlet air flow stream. The heating tower further includes at least one heating tower cell connected to the inlet duct and the outlet. The heating tower cell comprises a liquid distribution assembly along with a fill medium, wherein the liquid distribution assembly distributes liquid onto the fill medium. The heating tower additionally includes a housing that isolates the inlet air flow stream from the outlet air flow stream.

In accordance with another embodiment of the present invention, a heating tower apparatus for heating a liquid is provided. The tower includes an air flow inlet that provides an inlet air flow stream along with a plurality of heating tower cells, each connected to the inlet. Each of the heating tower cells comprises a liquid distribution assembly along with fill medium and an air flow outlet that provides an outlet air flow stream. The heating tower also includes a housing that extends over each of the air flow outlets of the heating tower cells that isolates the inlet air flow stream from the outlet air flow stream.

In accordance with yet a further embodiment of the present invention, a heating tower apparatus for heating a liquid is provided, comprising: means for drawing an air stream into the heating tower through an inlet; means for passing the air stream over a fill medium; means for passing the fluid over the fill medium; means for discharging the air steam from the heating tower through an outlet; and means for isolating the inlet air stream from the outlet air stream.

In accordance with another embodiment of the present invention, an air guide for a heating tower is provided. The air guide includes an air flow inlet which provides an inlet air flow stream. The air guide also includes an air flow outlet which provides an outlet air flow stream. During operation, the air guide isolates the inlet air flow stream from the outlet air flow stream.

In accordance with another embodiment of the present invention, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position; a first air flow outlet that provides a first outlet air flow stream, wherein said first air flow inlet has a first outlet door that moves between an open and a closed position; a second air flow outlet that provides a second outlet air flow stream, wherein said second air flow inlet has a second outlet door that moves between an open and a closed position; a liquid distribution assembly; and a fill medium, wherein said liquid distribution assembly distributes liquid onto said fill medium, wherein the heating tower is operable in a first configuration in which said first inlet door is in the open position, said second inlet door is in the closed position, said first outlet door is in the open position and wherein said second outlet door is in the closed position, and wherein the heating tower is operable in a second configuration in which said first inlet door is in the closed position, said second inlet door is in the open position, said first outlet door is in the closed position and wherein said second outlet door is in the open position, and wherein the tower can be switched between the first configuration and the second configuration.

In accordance with another embodiment of the present invention, a heating tower apparatus for heating a liquid which falls in a generally downward direction along a vertical axis is provided, comprising: more than one inlet; more than one outlet; a liquid distribution assembly; and a fill medium, wherein said liquid distribution assembly distributes liquid onto said fill medium, wherein each of said more than one inlet and said more than one outlet is selectively openable and closable.

In accordance with still another embodiment, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position, wherein during operation of the heating tower, said first inlet door is in the open position, said second inlet door is in the closed position; an air flow outlet that provides a first outlet air flow stream, wherein said air flow inlet is connected to a rotatable outlet duct; a liquid distribution assembly; and a fill medium, wherein said liquid distribution assembly distributes liquid onto said fill medium, wherein said outlet duct directionally rotates about the vertical axis over the air flow outlet to isolate the inlet air flow stream from the outlet air flow stream.

In accordance with another embodiment of the present invention, a heating tower apparatus for heating a liquid which falls in a generally downward direction along a vertical axis is provided, comprising: a first air flow inlet that provides a first inlet air flow stream, wherein said first air flow inlet has a first inlet door that moves between an open and a closed position; a second air flow inlet that provides a second inlet air flow stream, wherein said second air flow inlet has a second inlet door that moves between an open and a closed position, wherein during operation of the heating tower, said first inlet door is in the closed position and said second inlet door is in the open position; n air flow outlet that provides a first outlet air flow stream, wherein said air flow inlet is connected to a rotatable outlet duct; a liquid distribution assembly; and a fill medium, wherein said liquid distribution assembly distributes liquid onto said fill medium, wherein said inlet duct directionally rotates about the vertical axis over the first and second air flow inlets to isolate the inlet air flow stream from the outlet air flow stream.

In accordance with a further embodiment of the present invention, a method for heating a liquid using a heating tower is provided, comprising the steps of: actuating a first inlet door to an open position, opening a first air flow inlet; actuating a first outlet door to an open position, opening a first air flow outlet; drawing an air stream into the heating tower through the first air flow inlet; passing the air stream over a fill medium; discharging the air stream from the heating tower through the first air flow outlet; and isolating the inlet air stream for the outlet air stream.

In accordance with still another embodiment of the present invention, a heating tower apparatus for heating a liquid which falls in a generally downward direction along a vertical axis is provided, comprising: a first heating tower cell having a width W; and a second heating tower cell having the width W, adjacent said first heating tower cell, wherein said first heating tower cell and said second heating tower cell are spaced apart a distance D, wherein D is equal to 2W.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 21 is a transverse sectional view of a heating tower in accordance with an embodiment of the present invention.

FIG. 22 is a transverse section view of the heating tower depicted in FIG. 21 in an alternate configuration.

DETAILED DESCRIPTION

Figure 1:
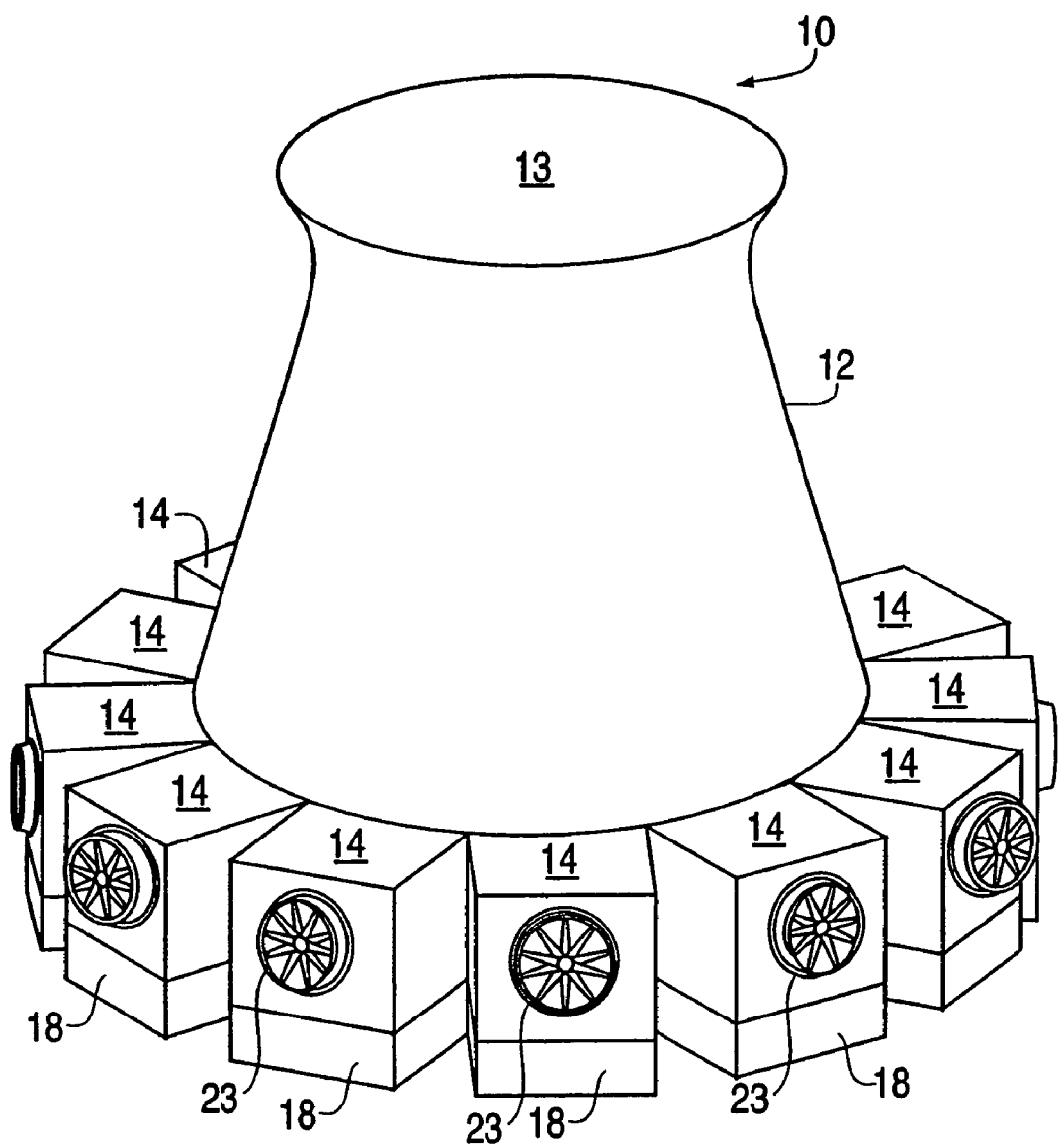
FIG. 1 is a side perspective view of a heating tower in accordance with an embodiment of the present invention.

Various preferred embodiments of the present invention provide for a heating tower apparatus and method for heating a liquid such as water or the like. In some arrangements, the heating tower and apparatus are utilized in vaporization or gasification systems and/or processes utilized for the vaporization of liquid natural gas (LNG). It should be understood, however, that the present invention is not limited in its application to LNG vaporization processes, but, for example, can be used with other systems and/or other processes that require the addition of heat to a liquid or the like. Preferred embodiments of the invention will now be further described with reference to the drawing figures, in which like reference numerals refer to like parts throughout.

Figure 2:
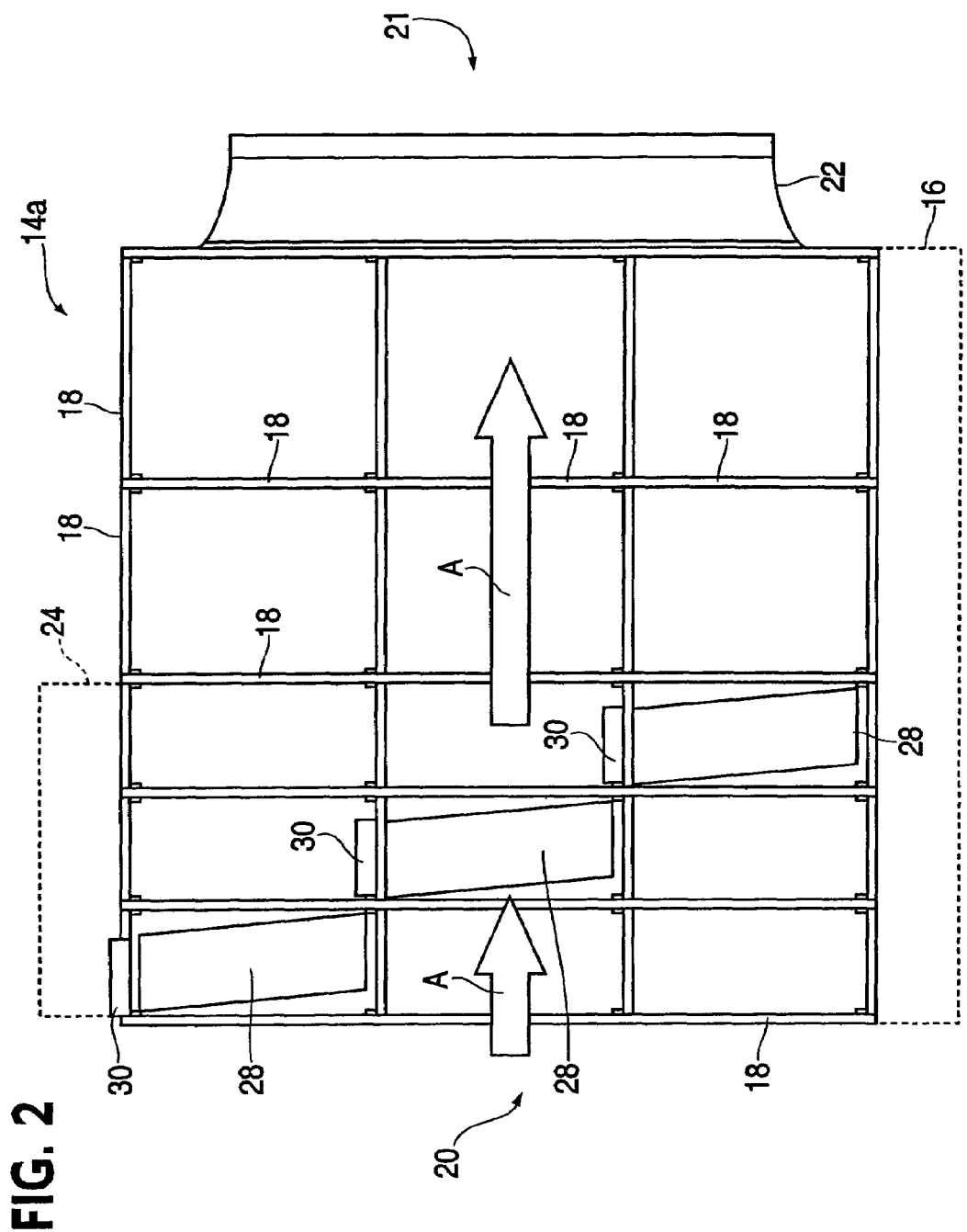
FIG. 2 is a cross-sectional view of a cross-flow heating tower cell that may be employed in the heating tower illustrated in FIG. 1, in accordance with an embodiment of the present invention.
Figure 3:
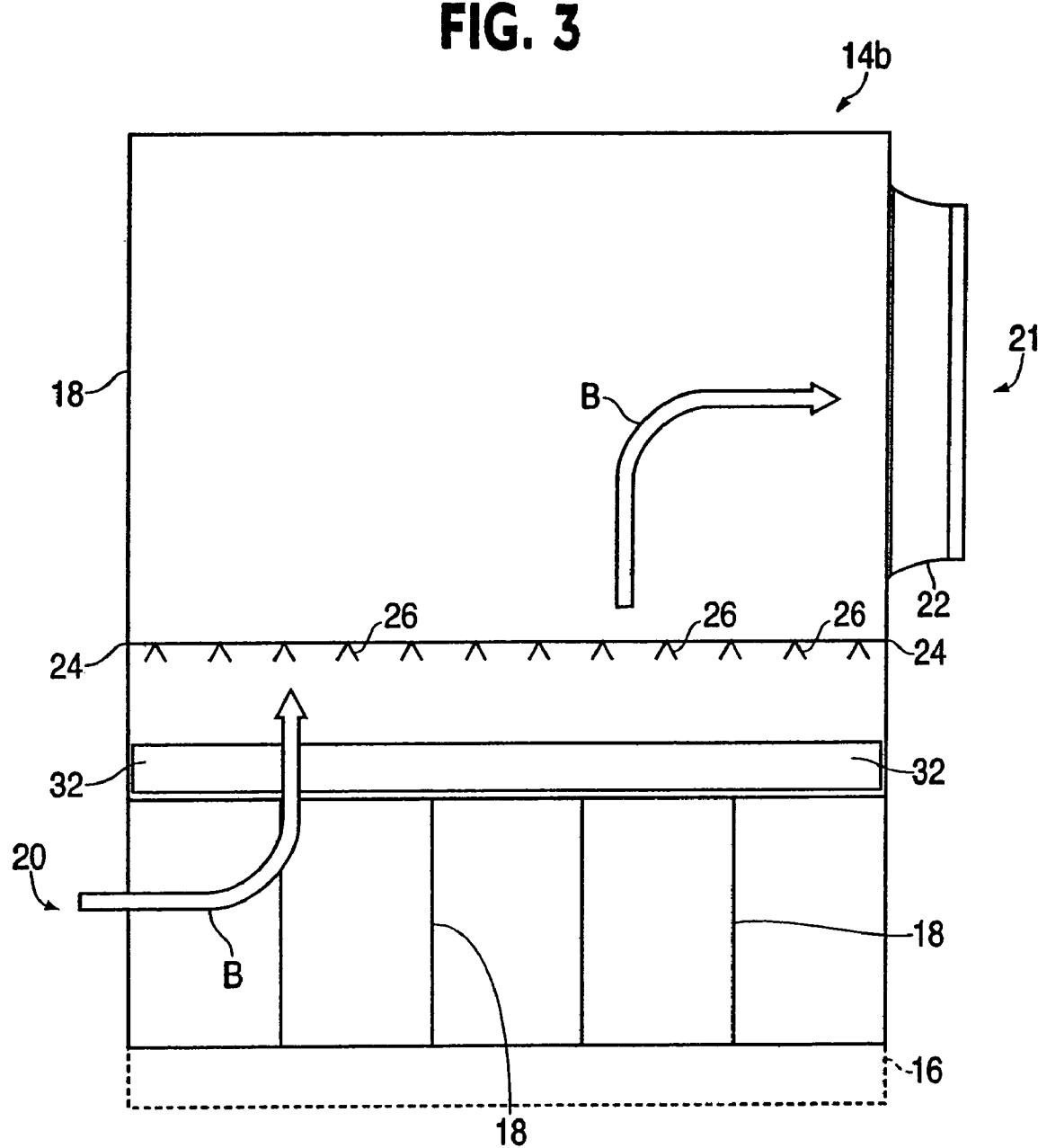
FIG. 3 is a cross-sectional view of a counter flow heating tower cell that may be employed in the heating tower illustrated in FIG. 1, in accordance with another embodiment of the present invention.

Referring now to FIGS. 1-3, a heating tower is depicted, generally designated 10, having an intake shell or duct 12 that defines an air inlet 13. The heating tower 10 also includes a plurality of individual heating tower cells 14 connected to the intake shell 12. FIG. 2 depicts a cross-flow heating tower cell, generally designated 14a while FIG. 3 depicts counter flow heating tower cell, generally designated 14b, both of which will be discussed in further detail below. While FIG. 1 illustrates a heating tower 10 that employs twelve heating tower cells 14 (two are located directly behind the hyperbolic shell and not pictured), the heating tower 10 may employ a varying number of heating tower cells 14 which can generally vary the heating capacity of the heating tower 10. Similarly, the heating tower 10 may employ entirely all cross-flow heating tower cells 14a, entirely all counter flow heating tower cells 14b, or any combination to the two types of heating tower cells 14.

As depicted in FIG. 1, the air intake shell 12 is preferably hyperbolic in shape; however, intake shells of varying geometries may be employed. The hyperbolic shaped air intake shell 12 provides a light weight, strong intake duct that defines the heating tower air intake 13 and isolates the air inlet from the heating tower air outlet, which will be discussed in greater detail below.

Referring now to FIG. 2, a cross-flow heating tower cell 14a is schematically depicted, which may be employed in the heating tower 10. The heating tower cell 14a is a mechanical draft heating tower cell 14a that includes a water basin 16 and a frame assembly or structure 18 to which the water basin 16 is connected. The frame assembly 18 includes an air inlet, generally designated 20, which is located above the water basin 16 and an outlet 21. The cross-flow heating tower cell 14a also includes a fan stack or shroud 22 connected to the frame assembly 18 that has an air generator or fan blade assembly disposed therein. The fan blade assembly is rotated by a gear structure which in turn is driven by a motor.

As illustrated in FIG. 2, the cross-flow heating tower cell 14a also includes a water distribution assembly 24 that is schematically depicted. The cross-flow heating tower cell 14a also includes a fill assembly, generally designated 28, that is oriented in a position that opposes the shroud 22 and fan assembly. The fill assembly 28 directly underlies the water distribution assembly 24 and extends along the entire air inlet of the cross-flow heating tower cell 14a. The fill assembly 28 is made of up of a number of cross-flow film fill packs and each fill pack comprises a plurality of individual cross-flow film fill sheets connected to one another. The film fill packs can be various sizes and dimensions depending upon the size and dimensions of the cross-flow heating tower cell 14a in which they are employed. The film fill packs that make up the fill assembly 28 are supported in the cross-flow heating tower cell 14a by a water distribution basin structure 30. In one preferred embodiment, the individual sheets that make up the fillpacks can hang from wire loops which wrap around fill support tubes that run transversely to the sheets. The wire loops then may be attached to the supporting structure such as the basin structure 30.

Referring now to FIG. 3, a counter flow heating tower cell 14b is schematically depicted, which may be employed in the heating tower 10. Like the cross-flow heating tower cell 14a depicted in FIG. 2, the counter flow heating tower cell 14b is a mechanical draft heating tower cell 14b that includes a water basin 16 and a frame assembly or structure 18 to which the water basin 16 is connected. The frame assembly 18 includes an air inlet, generally designated 20, which is located above the water basin 16 along with an air flow outlet 21. The counter flow heating tower cell 14b also includes a fan stack or shroud 22 connected to the frame assembly 18, that has an air generator or fan blade assembly 23 disposed therein. The fan blade assembly is rotated by a gear structure which in turn is driven by a motor.

As illustrated in FIG. 3, the counter flow heating tower cell 14b also includes a water distribution assembly 24 having a plurality of spray nozzles 26. The counter flow heating tower cell 14b also includes a fill assembly, generally designated 32, however, as the name of the counter flow heating tower cell 14b suggests, the fill assembly 32 is a counter flow fill assembly 32. The fill assembly 32 directly underlies the water distribution assembly 24 like its counterpart in the cross-flow fill assembly 28, however unlike its counterpart, it extends along the entire horizontal area of the frame assembly 18, directly above the air inlet 20. The fill assembly 32 is made of up of a number of counter flow film fill packs and each fill pack comprises a plurality of individual counter flow film fill sheets connected to one another. The film fill packs can be various sizes and dimensions depending upon the size and dimensions of the counter flow heating tower cell 14b in which they are employed. The film fill packs that make up the fill assembly 32 are also supported in the counter flow heating tower cell 14b by a plurality of horizontally disposed and spaced cross-members (not pictured).

Referring now to FIGS. 1-3, during operation of the heating tower 10, water is delivered to the water distribution assembly 24 and the distribution assembly proceeds to the deliver or spray the water onto the fill assemblies 28, 32. While water is sprayed onto the fill assemblies, air is simultaneously pulled through the heating tower cells 14a, 14b by their respective fan assemblies. The air initially enters the heating tower 10 via the air inlet 13 of the of the intake shell 12 where it then proceeds to the individual air flow inlets of the individual heating tower cells 14a, 14b.

As illustrated in FIG. 2, as the air flow enters the cross-flow heating tower cell 14a through the inlet 20, it proceeds to flow along a path A, where it contacts and flows through the fill assembly 28. As a result of this contact with the fill assembly, the heat exchange occurs and the air becomes very cool and moist. The cold moist air or effluent, then proceeds to exit the cross-flow heating tower cell 12a through the air flow outlet 21. Similarly, as illustrated in FIG. 3, the air flow enters the counter flow heating tower cell 14b through the inlet 20, beneath the fill assembly 32, and proceeds to flow along a path B, where it contacts and flows through the fill assembly 32, where heat exchange occurs and the air becomes very cool and moist. The cold moist air or effluent then exits the counter flow heating tower cell 14b through the air flow outlet 21. However, as illustrated in FIGS. 2 and 3, the flow path is such in the cross-flow cell 12a that air flows through the cross-flow cell 14a along path A, such that it contacts the fill assembly 28 and water in a perpendicular or normal relationship whereas the air flows through the counter flow cell 14*b* along path B such that it, contacts the fill assembly 32 in a concurrent relationship.

During operation of the heating tower 10 as described above, the intake shell 12 is positioned with respect to the heating tower cells 14 such that the intake shell 12 functions to isolate the flow of air into the inlet 13 from the outlet flow of effluent exiting the respective outlets 210*f* the heating tower cells 14. This positioning or orientation of the intake shell 12 with respect to the heating tower cells 14 reduces the occurrence of recirculation. More specifically this orientation reduces the occurrence of the heating tower effluent from exiting the cells 14 and re-entering the heating tower 10 through the inlet 13.

The cross-flow heating tower cell 14*a* and counter flow heating tower cell 14*b* depicted in FIGS. 2 and 3, respectively, may alternatively be utilized in heating tower arrangements that do not utilize an intake shell or the like. For example, in these arrangements such as the one depicted in FIG. 10, the individual cells 14 may be placed in groupings where the cells 14 are spaced apart a distance D of at least one cell width W, preferably two, and the individual cells 14 are preferably elevated off of the ground. In addition, the heating tower cells 14 may be employed singularly, wherein the single cell defines a heating tower, for example a single cell cross-flow heating tower or a single cell counter flow heating tower.

Figure 4:
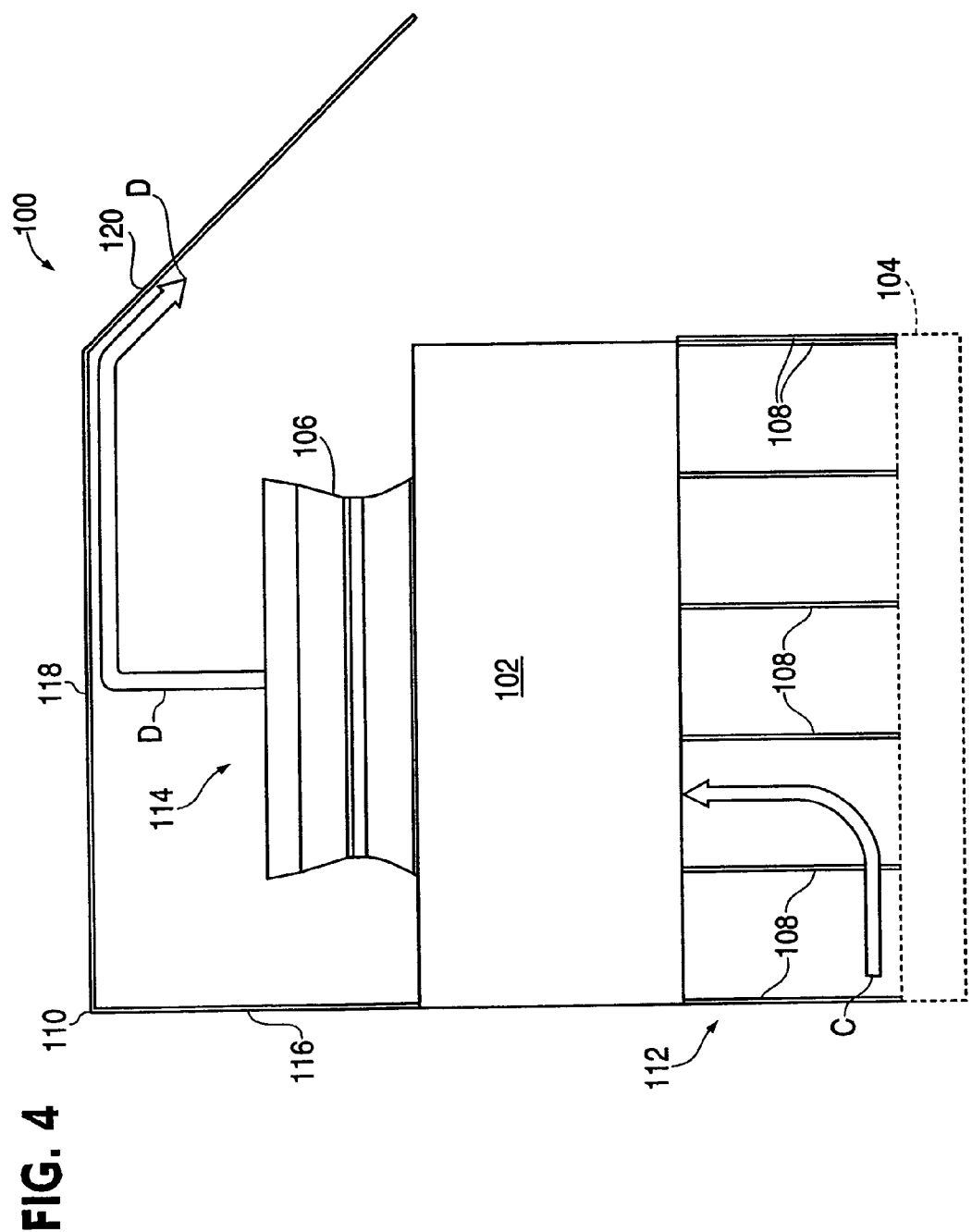
FIG. 4 is a schematic side view of a heating tower cell in accordance with another embodiment of the present invention.

Referring now to FIG. 4, a heating tower cell, generally designated 100, is depicted in accordance with another embodiment of the present invention. The heating tower cell 100 is a mechanical draft heating tower that includes a wet section 102, a water collection basin 104 a shroud or fan stack 106, a frame or frame assembly 108 and an upper housing 110 or canopy that extends above the fan stack 106. The heating tower cell 100 has an air flow inlet 112 and an air flow outlet 114.

The fan stack 106 includes a blade assembly disposed therein that is driven by a motor, while the wet section 102, includes liquid distributors along with a fill assembly, similar to the previous embodiments. The fill assembly includes a number of film fill packs that are made up of individual film fill sheets. Depending upon the heating tower cell 100 application, the heating tower cell 100 can either function in a cross-flow or counter flow capacity, which is dependent upon the type of film fill sheets utilized in the fill assembly of the wet section 102. Counterflow is shown because of the air inlet.

As illustrated in FIG. 4, the upper housing 110 has a first wall 116 that extends upwardly away from the wet section 102. The upper housing 110 also includes a second wall 118 connected to the first wall 114, that extends horizontally across the heating tower cell 100, above the fan stack 106. The upper housing 110 further includes a third, angled wall, or eave 120, connected to the second wall 118, that extends at an angle downwardly and away from the heating tower cell 100 a distance below the fan stack 106.

During operation of the heating tower cell 100, water is delivered to the wet section 102 where the spray nozzles proceed to spray the water onto the fill assemblies. While water is sprayed onto the fill assemblies, air is simultaneously pulled through the heating tower cell 100 by the fan assembly. The air initially enters the heating tower cell 100 via the air inlet 112 and proceeds to flow along an initial path C, where it flows through the wet section 102 and contacts the fill assembly. As the air passes through the fill assembly of the wet section 102, heat exchange occurs and the air becomes very cool and moist. The cold moist air or effluent, then proceeds to exit the heating tower cell 100 through the fan stack 106. Once the effluent exits the heating tower cell 100, the upper housing 110 directs the flow of effluent downward and outward, away from the heating tower cell 100 as indicated by the arrow D.

During the aforementioned operation of the heating tower cell 100 as described above, the upper housing 110 functions to isolate the flow of effluent from the flow of air entering the inlet 112. Once the effluent exits the heating tower cell via the fan stack 106, the air contacts the walls 116, 118, 120 of upper housing which force the effluent in a direction opposite the inlet 112, as indicated by the arrow D, reducing the likelihood of recirculation occurring. More specifically, the use of the upper housing 110 and, the action of its walls 116, 118, 120, reduces the occurrence of the heating tower effluent from exiting the heating tower cell 100 and re-entering the cell 100 through the inlet 112. Upper housing wall configuration is not limited to that shown, but, for example, walls 116 and 118 could be replaced by three or more straight wall segments that provide more of a curvature approximation. Furthermore, the upper housing 110 may be curvilinear.

Like the embodiments described previously, the heating tower cell illustrated in FIG. 4 may also be used in combination with an intake shell that extends from the inlet 112. Also, the heating tower cell 100 may be used in combination with multiple similar heating tower cells to form a large multi-cell heating tower, such as with a hyperbolic shell similar to FIG. 1.

Figure 5:
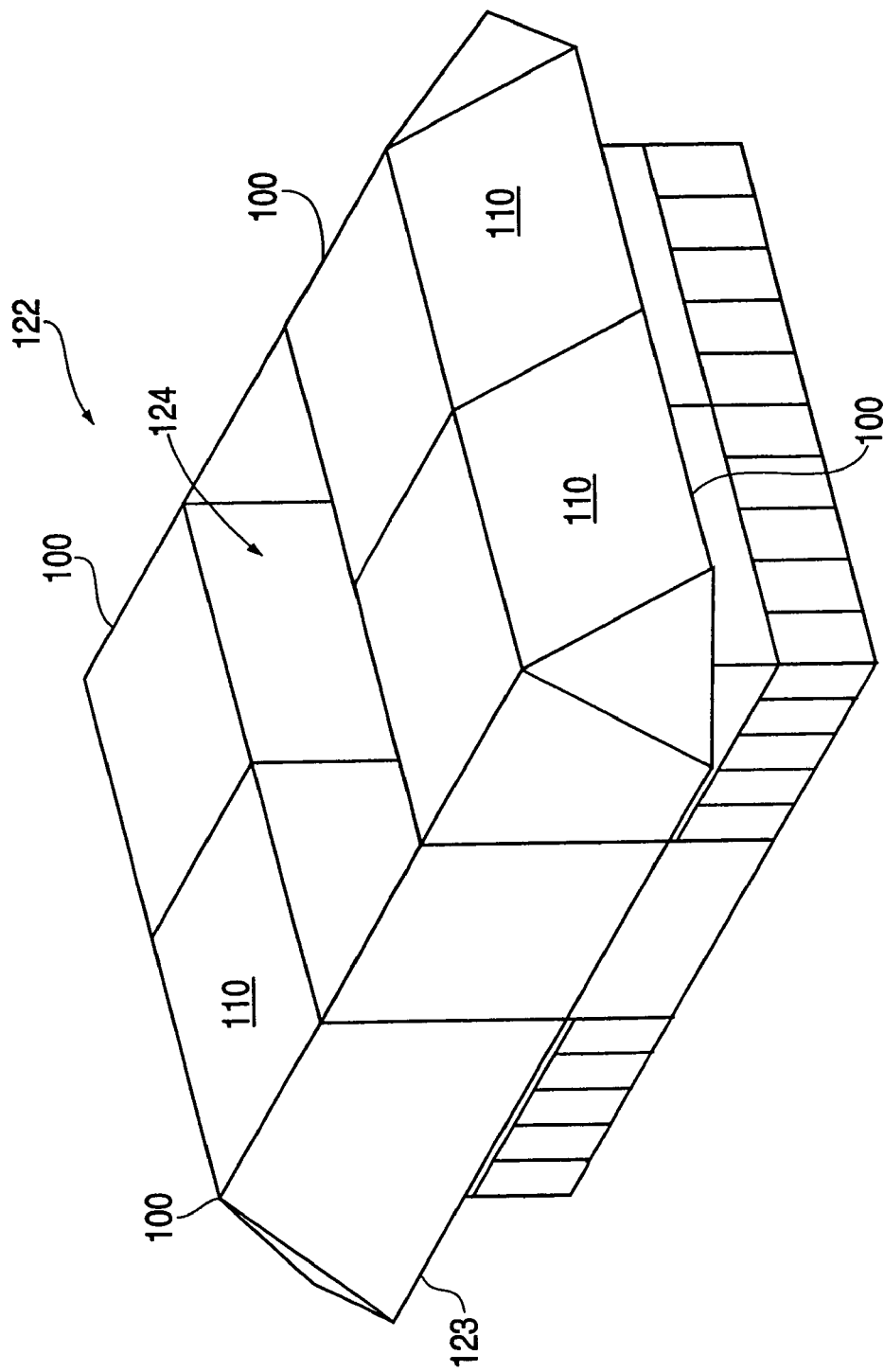
FIG. 5 is a top perspective view of a heating tower in accordance with the embodiment of FIG. 4.

FIG. 5 depicts a multi-cell heating tower, generally designated 122, that employs four heating tower cells 100, each similar to that illustrated in FIG. 4. Each of the cells 100 has an upper housing 110 that combines to form a roof or canopy 123 over all the fan stacks of the respective heating tower cells 100. In the embodiment depicted, the heating tower cells 100 have a common inlet 124 where air enters the to heating tower 122. The common inlet 124 functions like an air inlet shell, similar to that depicted on the embodiment illustrated in FIG. 1. The common inlet 124 combines with the roof or canopy 123 to reduce the occurrence of the heating tower effluent from exiting the heating tower cells 100 and re-entering the heating tower 122 through the air inlet 124.

Figure 6:
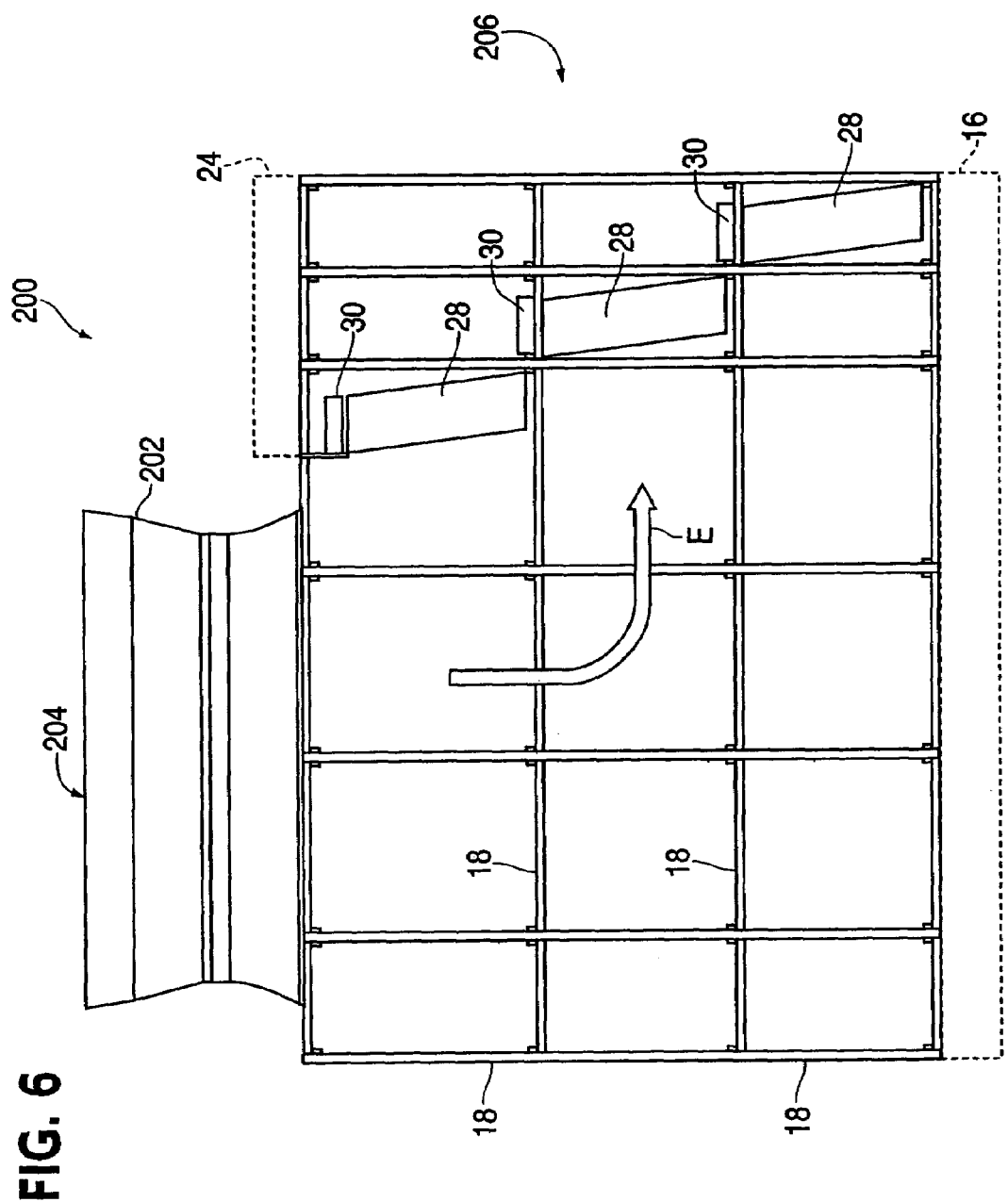
FIG. 6 is a schematic side view of a heating tower in accordance with yet another embodiment of the present invention.

Referring now to FIG. 6, a cross-flow heating tower cell 200 is depicted, in accordance with an alternative embodiment of the present invention. The heating tower cell 200 is a mechanical draft heating tower cell 200, similar to the previous embodiments described, that includes a water basin 16 and a frame assembly or structure 18 to which the water basin 16 is connected. The heating tower cell 200 is preferably elevated or raised off of the ground like the previous embodiments, however the this elevation is not necessarily required for proper operation. The cross-flow heating tower cell 200 also includes a fan stack or shroud 202 connected to the frame assembly 18 that defines an air inlet 204. The fan stack 202 has an air generator or fan blade assembly disposed therein. The fan blade assembly is rotated by a gear structure which in turn is driven by a motor.

As illustrated in FIG. 6, the cross-flow heating tower cell 200 also includes a water distribution assembly 24 along with an air flow outlet, generally designated 206. The cross-flow heating tower cell 200 also includes a fill assembly, generally designated 28, that directly underlies the water distribution assembly 24 and extends across the entire outlet 206 of the cross-flow heating tower cell 200. The fill assembly 28 is made of up of a number of cross-flow film fill packs and each fill pack comprises a plurality of individual cross-flow film fill sheets connected to one another. The film fill packs can be various sizes and dimensions depending upon the size and dimensions of the cross-flow heating tower cell 200 in which they are employed. The film fill packs that make up the fill assembly 28 are supported in the cross-flow heating tower cell 200 by wire loops or the like, which wrap around fill support tubes that run transversely to the individual sheets of the packs. The wire loops then may be attached to the supporting structure such as the basin structure 30.

During operation of the cross-flow heating tower cell 200, water is delivered or sprayed onto the fill assembly 28 via the water distribution assembly 24. While water is sprayed onto the fill assembly 28, air is simultaneously pulled through the cross-flow heating tower cell 200 by the fan assembly. The air initially enters the heating tower 200 via the air inlet 204, where it then proceeds to contact the fill assembly 28.

As illustrated in FIG. 6, as the air flow enters the cross-flow heating tower cell 200 through the inlet 204 and it proceeds to flow along a path E, where it contacts the fill assembly 28 in a perpendicular or normal relationship, and flows through the wet fill assembly 28 causing heat exchange to occur. Again, due to this contact the air becomes very cool and moist. The cold, moist air or effluent, then proceeds to exit the cross-flow heating tower cell 200 through the air flow outlet 206.

During operation of the cross-flow heating tower cell 200 as described above, the fan stack or shroud 202 functions to isolate the flow of air into the inlet 204, from the outlet flow of effluent exiting the outlet 206. This positioning or orientation of the fan stack 202 in relation to the outlet 206, reduces the occurrence of recirculation. More specifically, this orientation reduces the occurrence of the heating tower effluent from exiting the cell 200 and re-entering the cell through the inlet 204.

Figure 7:
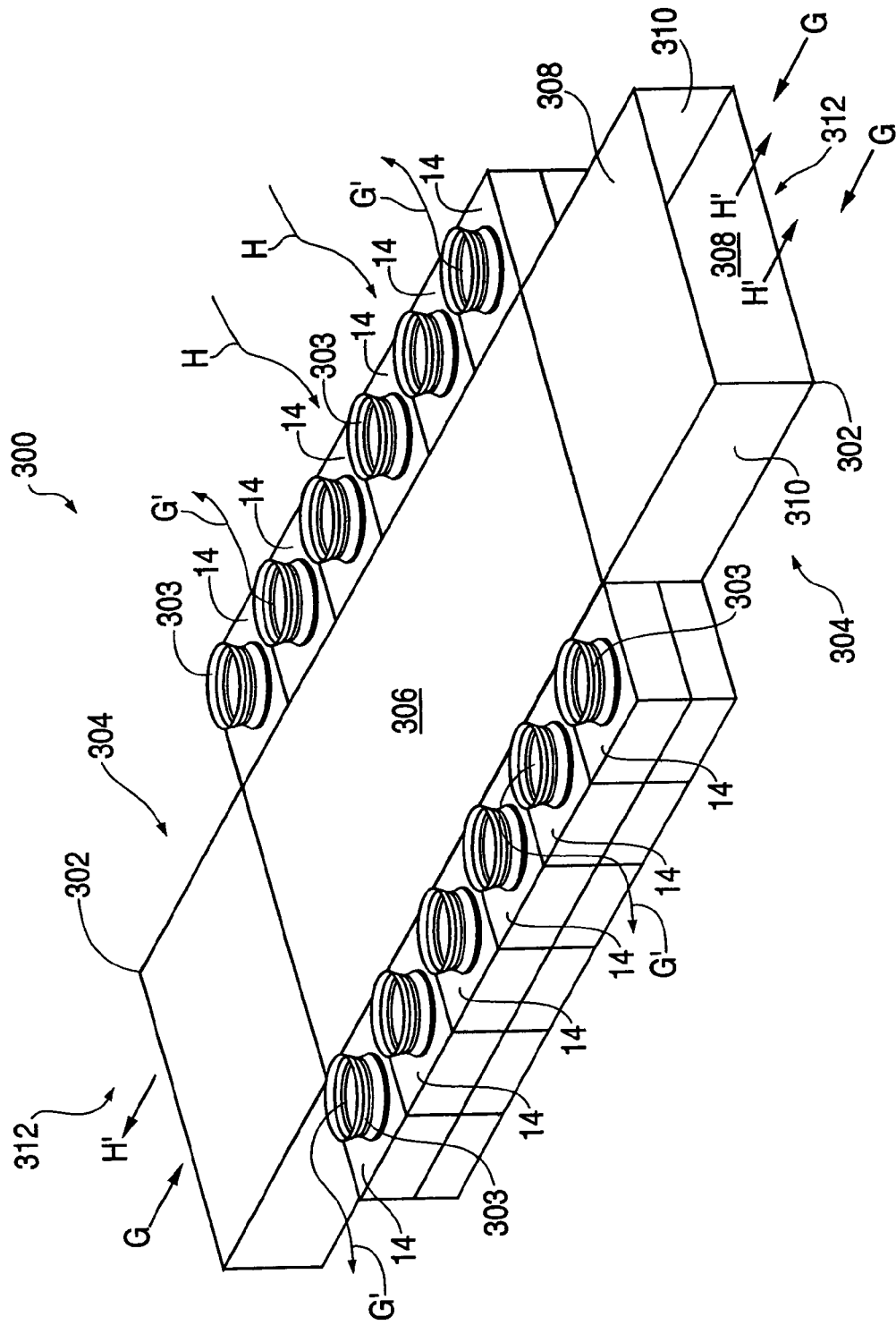
FIG. 7 is top perspective view of a heating tower cell in accordance with still another embodiment of the present invention.

Referring now to FIG. 7, a heating tower, generally designated 300, is illustrated in accordance with another embodiment of the present invention. As depicted in FIG. 7, the heating tower includes an air inlet duct 302 through which the heating tower effluent travels as the air enters the heating tower 300. Similar to the embodiment depicted illustrated in FIGS. 1-3, the heating tower 300 includes a plurality of individual heating tower cells 14 that are connect to the air inlet duct 302, and to one another, in an opposed, series relationship. Like the embodiments discussed previously in FIGS. 1-3, the heating tower cells 14 utilized in the tower 300 are each mechanical draft heating tower cells 14 having a fan stack our shroud 303 having a fan assembly disposed therein. The fan stacks 303 of each of the heating tower cells 14 combine to define the air flow outlet(s) of the heating tower 300. Also, the heating tower cells 14 may be either a cross-flow design, similar to that depicted in FIG. 2, or a counter flow design, similar to that depicted in FIG. 3.

While FIG. 7 illustrates a heating tower 300 that employs twelve heating tower cells 14, the heating tower 300 may employ a varying number of heating tower cells 14, enabling the end user to adjust the heating capacity of the heating tower 300. Similarly, the heating tower 300 may employ entirely all cross-flow heating tower cells 14, entirely all counter flow heating tower cells 14, or any combination to the two types of heating tower cells 14.

As depicted in FIG. 7, the air inlet duct 302 is preferably rectangular in shape, having two end sections 304 and a middle section 306. Each of the sections include opposing top and bottom walls connected to two opposing side walls 310. Though an air inlet duct 302 having a generally rectangular geometry is depicted, inlet ducts 302 of varying geometries may be employed. In the illustrated embodiment, the air inlet duct defines a dual, air flow inlet 312 for the heating tower 300 which and functions to isolate the air inlet 312 from the heating tower air outlets of the individual heating tower cells 14.

During operation of the heating tower 300, air is pulled into the heating tower 300 through the heating tower cells viaducts 302 as indicated by arrows G. The air proceeds to flow into the wets sections of the respective heating tower cells 14, where the heat exchange occurs, similar to the embodiments depicted in FIGS. 1-6. As the air flows through the wet sections, it imparts its heat upon the falling liquid and the air temperature significantly becomes cooler. The cold air or effluent then proceeds to exit each of the individual heating tower cells 14 through the stack 303 of the individual cells 14, as indicated by arrow G'.

During the aforementioned operation of the heating tower 300, the air flow inlet duct 302 functions to isolate the inlet airflow entering the individual heating tower cells from the effluent air being discharged from the stacks 303, reducing the likelihood of recirculation occurring.

Alternatively, the heating tower depicted in FIG. 7, and the individual cells 14, may be reconfigured so that the air inlet duct 302 functions as an outlet duct through which the heating tower effluent travels as the effluent exits the heating tower 300. Similar to the embodiment depicted illustrated in FIGS. 1-3, the heating tower 300 includes a plurality of individual heating tower cells 14 that are connected to the air outlet duct 302, and to one another, in an opposed, series relationship. Like the embodiments previously discussed, the heating tower cells 14 utilized in the tower 300 are each mechanical draft heating tower cells 14 having a fan stack our shroud 303 having a fan assembly disposed therein. In this reconfigured embodiment, however, the fan stacks 303 of each of the heating tower cells 14 now combine to define the air flow inlet(s) of the heating tower 300 instead of the outlet.

During operation of the heating tower 300 with that alternative configuration, as previously described, air is pulled into the heating tower 300 through the heating tower cells via each of the fan stacks 303 as indicated by the arrows H. The air proceeds to flow into the wet sections of the respective heating tower cells 14, where the heat exchange occurs, similar to the embodiments depicted in FIGS. 1-6. As the air flows through the wet sections, it imparts its heat upon the falling liquid and the air temperature significantly becomes cooler and accumulates the moisture. The cold air or effluent then proceeds to exit each of the individual heating tower cells 14 where it enters the air flow outlet duct 302, as indicated by arrows H'.

Figure 8:
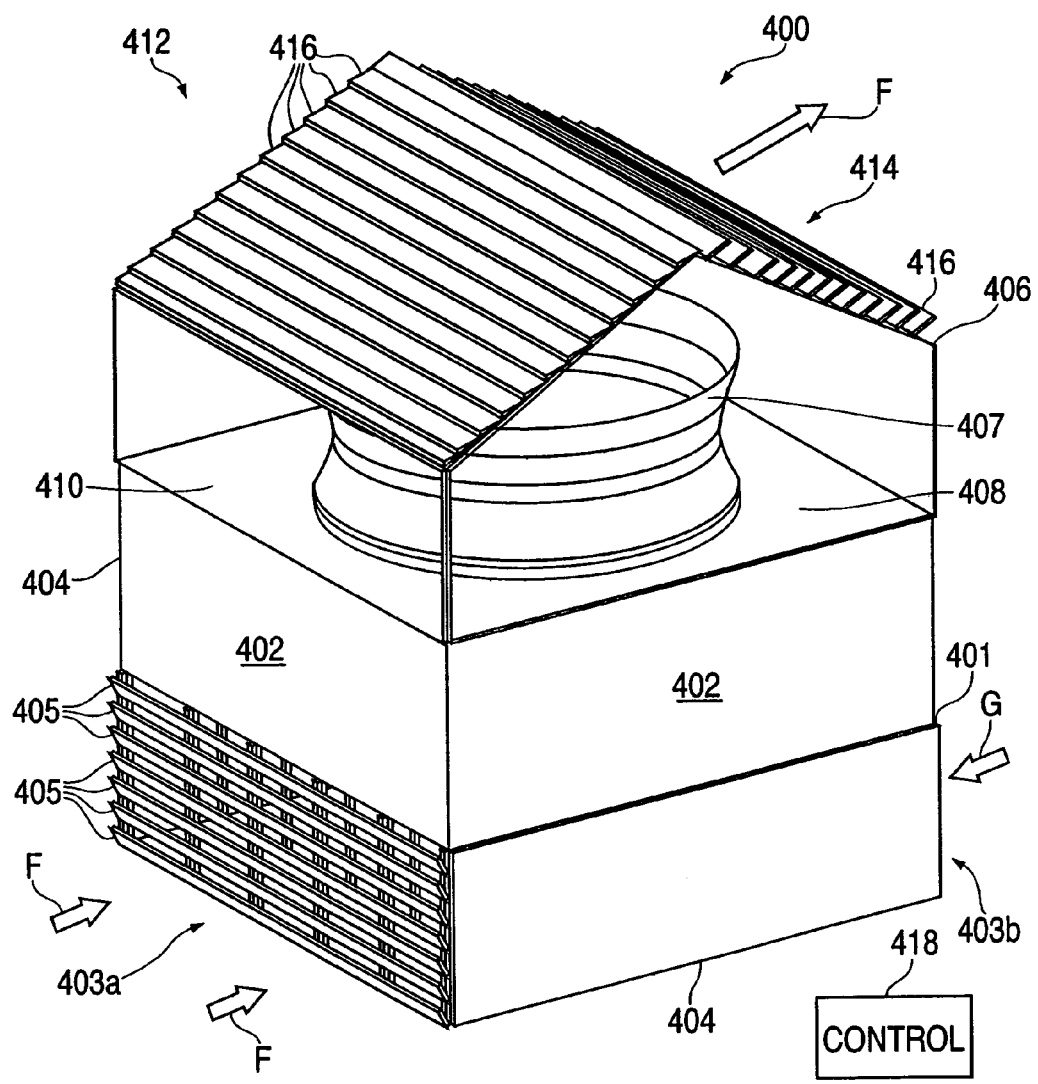
FIG. 8 is partial cut-away, side perspective view of a heating tower cell in accordance with another embodiment of the present invention.

Referring now to FIG. 8, a heating tower cell, generally designated 400, is illustrated in accordance with another embodiment of the present invention. The heating tower cell 400 is similar to the previous embodiments depicted in FIGS. 1-7. The heating tower cell 400 can be oriented to perform in a cross-flow heating tower arrangement or configuration, similar to that illustrated in FIGS. 2 and 6, or the heating tower cell 400 can be oriented to perform in a cross-flow heating tower arrangement or configuration, similar to that illustrated in FIG. 3. However, whereas the embodiment depicted in FIG. 3 employs a side stack, the embodiment depicted in FIG. 8 employs a vertical stack.

Like the embodiments previously described in connection with FIGS. 1-7, the heating tower cell 400 is a mechanical draft tower cell 400 that includes a water basin (not pictured) and a lower housing 401. The lower housing 401 includes a wet section 402 along with the water basin and is composed of four sides 404. The heating tower cell 400 also includes a first air inlet 403a and a second air inlet 403b which opposes the first air inlet 403a. Each the air inlets 403a, 403b have a plurality of inlet doors or louvers 405, which function to control the flow of air through the inlets 403a, 403b, as desired during heating tower cell 400 operation. The heating tower cell 400 also includes a shroud or fan stack 407 mounted on top of the lower housing 401 that has an air generator or fan blade assembly disposed therein. The fan blade assembly is rotated by a gear structure which in turn is driven by a motor.

The wet section 402, like those of the previously discussed embodiments, includes liquid distributors along with a fill assembly, both of which are not pictured for the purposes of clarity. The fill assembly includes a number of film fill packs that are made up of individual film fill sheets. Depending upon the heating tower cell 400 application, the heating tower cell can either be fitted with counter flow film fill sheets or cross-flow film fill sheets, and therefore the cell may either function as a counter flow cell in counter flow tower or a cross-flow cell in a cross-flow tower.

As illustrated in FIG. 8, the heating tower cell 400 also includes an upper housing or outlet housing 406, that is mounted to or connected to the lower housing 401. The outlet housing 406 includes two opposing end walls 408 extending upwardly from the lower housing 401 which are connected to two opposing side walls 410, which also extend upwardly from the lower housing 401. The outlet housing 406 also includes a first air outlet 412, positioned in a downward sloping orientation and a second air outlet 414, positioned opposite the first air outlet 412, in a downward sloping orientation. Each of the air outlets 412, 414 include a series of louvers or doors 416 that extend horizontally between the end walls 408 of the outlet housing 406 that function to control the flow of air or effluent out of the respective outlets 412, 414.

In the embodiment illustrated in FIG. 8, the air flow inlets 403a, 403b of the heating tower cell 400 are illustrated on opposing side walls only, however, the heating tower cell 400 may have multiple air inlets 403, similar to the ones depicted, on all four sides 404 of the lower housing 401. Each of the multiple air inlets also include inlet louvers or doors 404, that extend horizontally along the entire length of the walls. Similarly, the air outlets 414 do not have to be positioned on opposing sides, in a downward sloping orientation. Alternatively, the upper housing 406 may have a generally square or rectangular geometry, similar to the lower housing 401, having multiple air outlets 414, similar to that depicted, each located or extending along the four sides 408, 410 of the upper housing 406. Each of the multiple air outlets 412, 414 also include outlet louvers or doors 406, that extend horizontally along the entire length of the outlets.

During operation of the heating cell 400, water is delivered to the wet section 402 where nozzles proceed to distribute the water onto the fill assembly whether it be cross-flow or counter flow. While water is distributed onto the fill assembly, air is simultaneously pulled through the heating tower cell 400 by the fan assembly. As indicated by the arrows F, the air initially enters the heating tower cell 400 via the air inlet 403a and proceeds to flow into and through the wet section 402, where it contacts the fill assembly. As the air passes through the wet section 402, heat exchange occurs and then becomes very cool and moist. The cool, moist air, or effluent, then proceeds to exit the heating tower cell 400 through the fan stack 407.

As illustrated in FIG. 8, the fan stack 407 is disposed on top of lower housing within the upper housing 406, thus, once the effluent exits the heating tower cell 400, it enters the upper housing 406. In the embodiment depicted, the heating tower cell 400 is configured such that the louvers 416 of the first air outlet 412 are closed, closing the outlet 412, while the louvers or doors 416 of the second air outlet 414 are open. Therefore, upon entering the upper housing 406, the air proceeds to exit the heating tower cell 400 through the second air outlet 414 as indicated by the arrow F.

During operation of the heating tower cell 400, the upper housing 406, in combination with the louvers 416 of the air outlet 414, functions to isolate the flow of effluent from the fan stack 407 from the air entering the inlet 403. Once the effluent exits the heating tower cell 400 via the fan stack 407, the effluent is prevented from exiting the upper housing 406 through the first air outlet 412, because the louvers 416 are closed. The effluent is therefore essentially forced or directed to exit via the second air outlet 414. The effluent therefore exits the heating tower cell 400 on the side opposite the air inlet 403, reducing the likelihood that recirculation will occur. More specifically, the utilization of the second air flow outlet 414 in combination with the first air inlet 403a, reduces the occurrence of the heating tower cell 400 effluent from exiting the heating tower cell 400 and re-entering the cell 400 through the inlet 403a.

Also during operation, the heating tower cell 400 may operate using an alternate configuration then that illustrated in FIG. 8. The heating tower cell 400 may also operate via configuration, wherein the first inlet 403a is closed along with the second outlet 414, and the second air inlet outlet 403b is open along with the first air outlet 412. While in this configuration, air flows in the heating tower cell 400 via the second inlet 403b and though the wet section 402 and out the fan stack 407, as described in connection with the previous embodiment. However, contrary to the configuration depicted in FIG. 8, the effluent exits the fan stack 407 and proceeds to exit the upper housing 406 through the first outlet 412, opposite the second air inlet 403b.

Like the configuration illustrated in FIG. 8, the above-described alternate configuration louvers 416 of the first air outlet 412, functions to isolate the flow of effluent of the heating tower cell 400 from the air entering the second inlet 403b. Once the effluent exits the heating tower cell 400 via the fan stack 407, the effluent is now prevented from exiting the upper housing 406 through the second air outlet 414, because the louvers 416 are closed. The effluent is therefore forced or directed to exit via the first air outlet 412. The effluent therefore exits the heating tower cell 400 on the side opposite the second air inlet 403b, reducing the likelihood that recirculation will occur. More specifically, the closing of the louvers 416 on the second air outlet 414, while opening the louvers 416 on the first air outlet 412, in combination with utilizing the second inlet 403b, reduces the occurrence of the effluent from exiting the heating tower cell 400 and re-entering the cell 400 through the second inlet 403b.

The louvers 405 and 416 of the inlets 403 and outlets 412, 414, respectively, preferably are actuated between the open and closed positions by mechanical actuators. The actuators are operated by a control 418 which allows the heating tower cell 400 operator to select or designate which inlets 403 or outlets 412, 414 to open or close during cell 400 operation, for example in response to atmospheric conditions, such as wind direction. Also, the controller 418 may include a sensing means that senses the atmospheric conditions, or changes in the atmospheric conditions, and automatically changes the configuration of the heating tower cell by opening and closing the air flow inlets and outlets accordingly.

Figure 9:
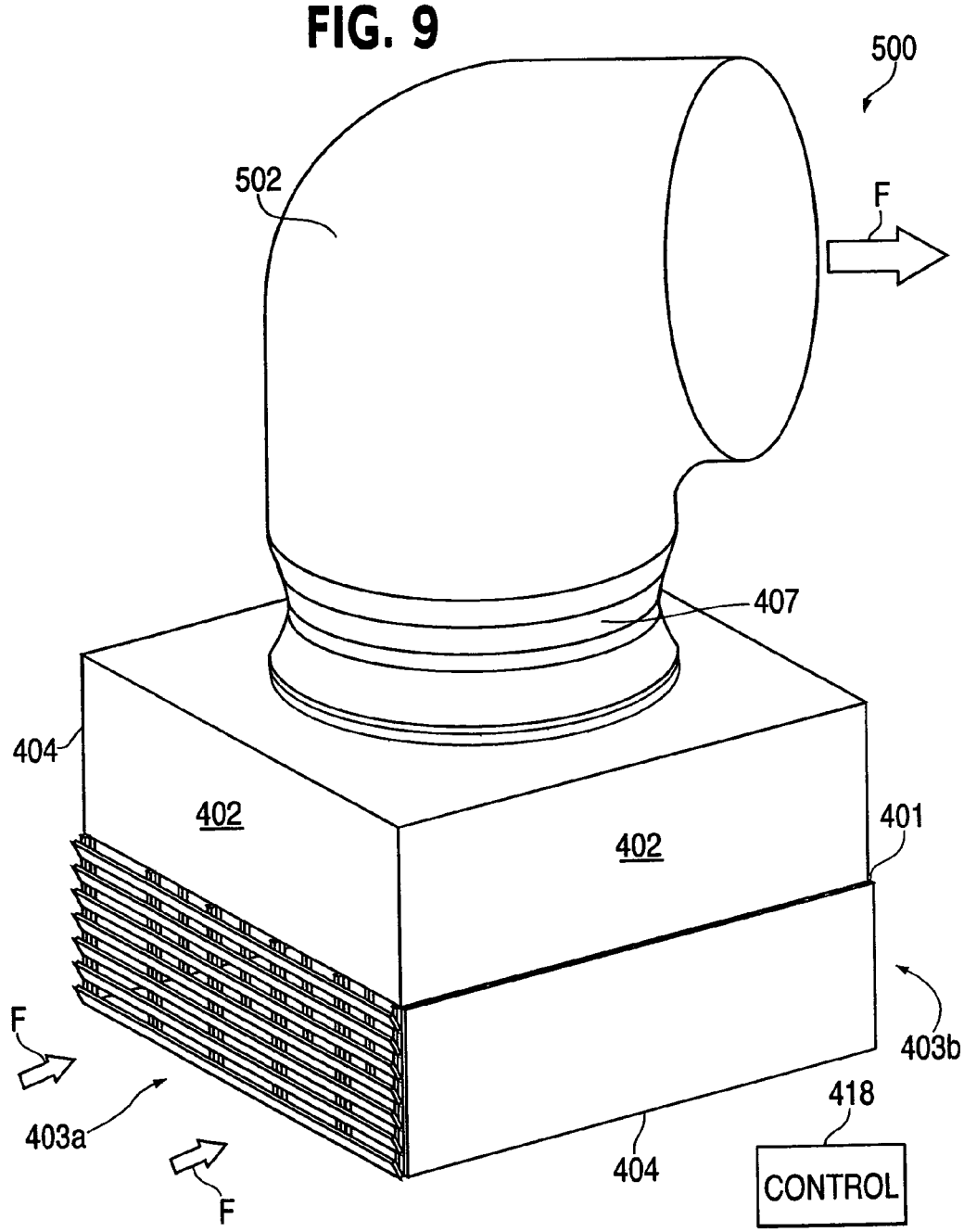
FIG. 9 is a top perspective view of a heating tower cell in accordance with another embodiment of the present invention.

Referring now to FIG. 9, a heating tower cell 500 is illustrated, which is an alternative embodiment of the heating tower cell 400 depicted in FIG. 8. The heating tower cell 500 is similar to that illustrated in FIG. 8, however the heating tower cell 500 depicted in FIG. 9 employs an exhaust duct or port 502 instead of an upper housing 406.

As illustrated in FIG. 9, the exhaust port 502 is connected to the fan stack 407 and provides a pathway for the heating tower effluent to exit, away from the inlet 403a. During the operation of the heating tower cell 500, the effluent exits the heating tower cell 500 via the fan stack 407 and proceeds through the exhaust port 502. The exhaust port 502 acts to direct the effluent along a path outward, away from the heating tower cell 500, as indicated by arrow F. This path reduces the likelihood of recirculation occurring. More specifically, the exhaust duct 502 functions to reduce the occurrence of the heating tower cell effluent from exiting the heating tower cell 500 and re-entering the cell 500 through the inlets 403a and 403b.

The exhaust duct 502 of the heating tower cell 500 is preferably rotated about the fan stack 407 by a mechanical rotation means. Like the actuators in the embodiment depicted in FIG. 8, the mechanical rotation means is operated by the control 418 which allows the heating tower cell 500 operator to select a desired position for the exhaust duct 502 during cell 500 operation, for example in response to atmospheric conditions, such as wind direction. Also, the controller 418 may include a sensing means that senses the atmospheric conditions, or changes in the atmospheric conditions, and automatically rotates the exhaust duct 502 to a predetermined or pre-programmed position.

Figure 10:
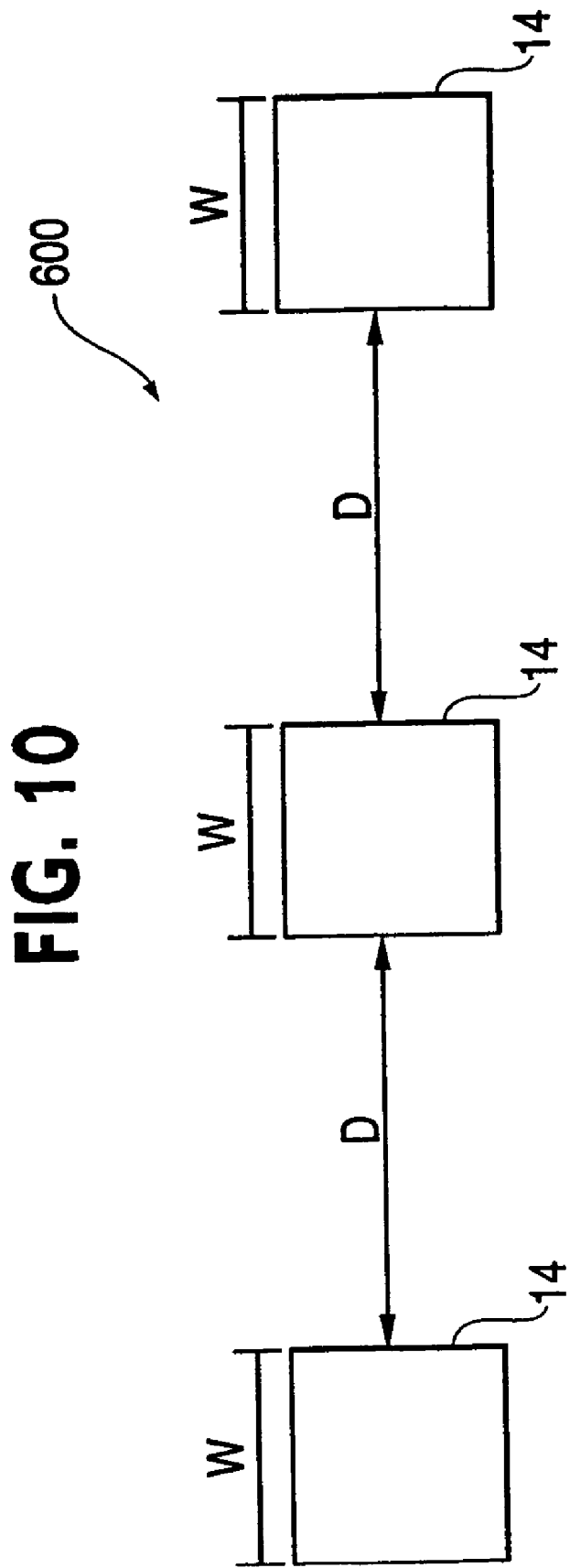
FIG. 10 is a schematic plan view of a heating tower configuration in accordance with another embodiment of the present invention.

Referring now to FIG. 10, a schematic plan view of a heating tower configuration, generally designated 600, is depicted in accordance with an alternative embodiment of the present invention. As illustrated in FIG. 10, the individual heating tower cells 14 of the heating tower configuration 600 each have a width W while they are spaced apart a distance D. In some heating tower configurations, for example, the heating tower cell width W may range from approximately 30' to approximately 60' while in other configurations the width W of the individual cells may range from approximately 50' to approximately 60'. In one preferred embodiment, the distance D between the individual heating tower cells 14 is preferably twice the width W of the heating tower cells 14, or equal to approximately 2W.

Figure 11:
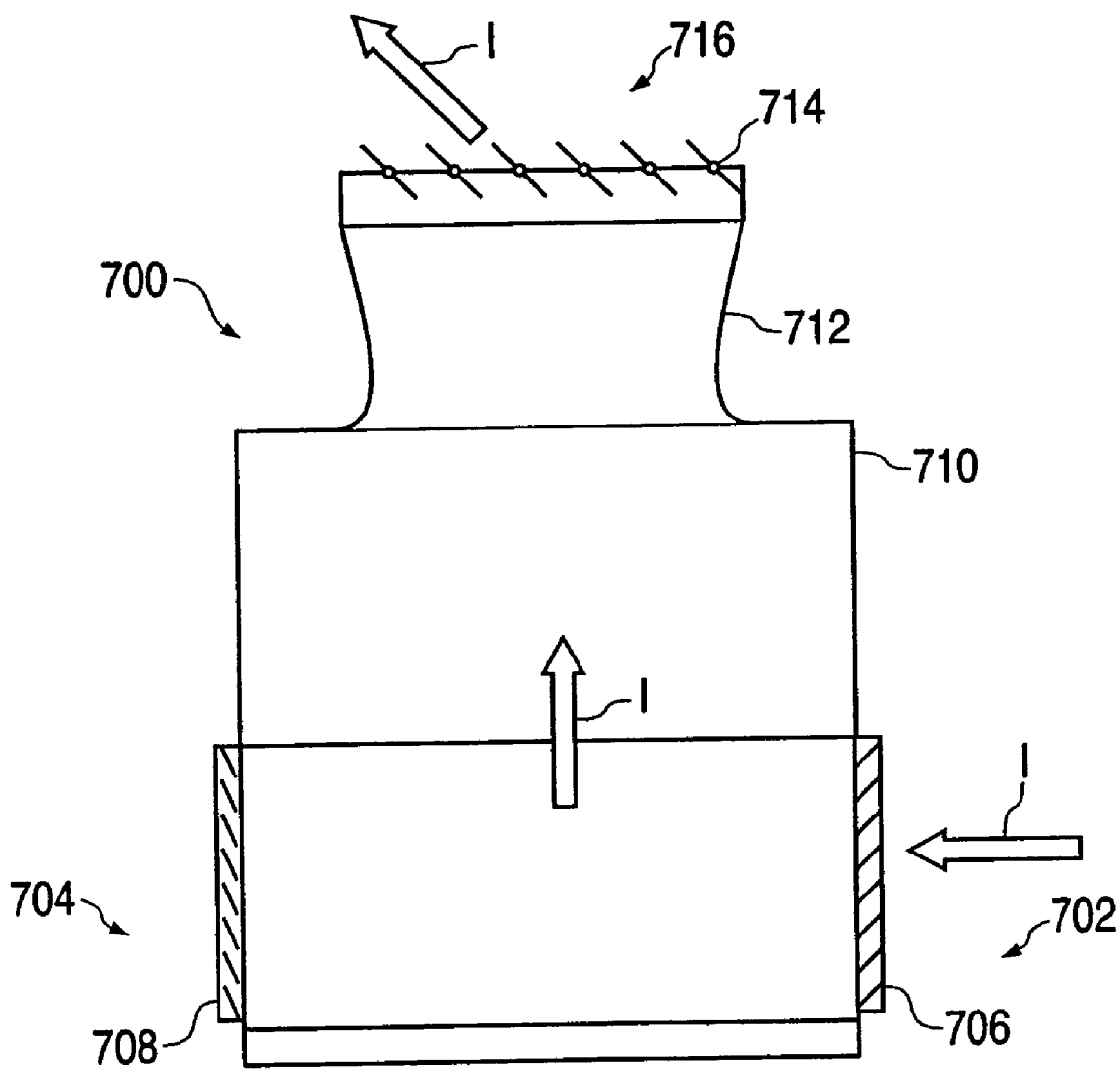
FIG. 11 is a schematic side view of a heating tower in accordance with another embodiment of the present invention.

Referring now to FIG. 11, a side, schematic view of a heating tower is illustrated, generally designated 700. The heating tower 700 is preferably a mechanical draft heating tower having opposing air inlets 702 and 704 along with a first series of blade type damper doors 706 which correspond to the first inlet 702 and a second series of blade type damper doors 708 which correspond to the second inlet 704. While blade type damper doors 706, 708 are illustrated in FIG. 11, the heating tower 700 may alternatively employ damper doors other that the blade type ones depicted, for example roll-up doors. The first series of damper doors 706 function to control inlet air flow through the first inlet 702 while the second series of damper doors 708 function to control inlet air flow through the second inlet 704. The heating tower further includes a wet section 710 located generally above the inlets 702, 704 for counterflow or horizontally adjacent the inlets 702, 704 for crossflow along with a fan stack 712 connected to the wet section 710. As illustrated in FIG. 11, the heating tower 700 also includes a series of rotatable vanes 714 that are connected to the fan stack 712 and extend across the heating tower outlet, generally designated 716.

During operation of the heating tower 700, water is delivered to the wet section 710 similar to that described in connection with the previous embodiments, while air is simultaneously pulled through the heating tower 700 by a fan assembly. In the configuration depicted, the first damper doors 706 are open while the second 708 are closed. Therefore, the air enters the heating tower 700 via the first air inlet 702 and proceeds to flow along an the path I, where it flows through the wet section 710 and contacts the fill assembly. As the air passes through the fill assembly of the wet section 710, heat exchange occurs and the air becomes very cool. The cold air or effluent, then proceeds to exit the heating tower 700 through the fan stack 712. As the effluent exits the heating tower 700, the rotatable vanes 714 function to isolate the flow of effluent from the fan stack 712 from the air entering the inlet 702.

As illustrated in FIG. 11, the rotatable vanes direct the effluent to exit the heating tower 700 on the side opposite the air inlet 702, as indicated by the airflow stream I, reducing the likelihood that recirculation will occur. More specifically, the utilization of the rotatable vanes 714 in combination with the first air inlet 702, reduces the occurrence of the heating tower 700 effluent from exiting the heating tower 700 and re-entering the tower 700 through the inlet 702.

Also during operation, the heating tower 700 may operate using an alternate configuration then that illustrated in FIG. 11. The heating tower 700 may also operate via a configuration, wherein the first series of damper doors 706 are closed, while the second series of damper doors 708 are open. In this configuration, the rotatable vanes 714 are rotated in a direction opposite the second inlet 704. While in this configuration, air flows into the heating tower 700 via the second inlet 704 and though the wet section 710 and out the fan stack 712, as described in connection with the previous embodiment. However, contrary to the configuration depicted in FIG. 11, the effluent exits the fan stack 712 opposite the second air inlet 704.

The various embodiments of the heating towers and heating tower cells previously described and depicted in FIGS. 1-11 may alternatively be configured to operate without the liquid or water contacting the air flowing through the respective heating tower cells, i.e., dry. In these alternative dry embodiments, the dry heating towers and cells do not utilize direct air to circulating fluid contact to assist in the heat exchange between the ambient air flowing through the heating tower and the water or liquid to be heated, but rely on the air being drawn in contact to a heat exchanger surface and the heat transfer occurring sensibly through that surface.

For example, an alternative embodiment of the heating tower configuration depicted in FIGS. 1-3 may utilize a series and/or bundle of tubes or coils through which the fluid to be heated flows for heat transfer, instead of utilizing the water distribution assembly 24 and fill assembly 28. Similarly, an alternative dry embodiment of the heating tower configurations depicted in FIGS. 4, 5, 7 and 10 may utilize a series and/or bundle of tubes or coils through which the fluid to be heated flows for heat transfer, instead of utilizing the water distribution assembly 24 and fill assembly 28.

Accordingly, as previously discussed above, due to the dry configuration of the alternative embodiments, an evaporative liquid such as water is not distributed on to series and/or bundle of tubes or coils. Instead, dry ambient air is passed over the series and/or bundle of tubes or serpentine coils through which the fluid to be heated flows, for heat exchange or heat transfer. These coils may be oriented or positioned in groups, bundles and/or packs, and some or all of the tubes may have fins attached thereto to help facilitate heat exchange or heat transfer.

Figure 12:
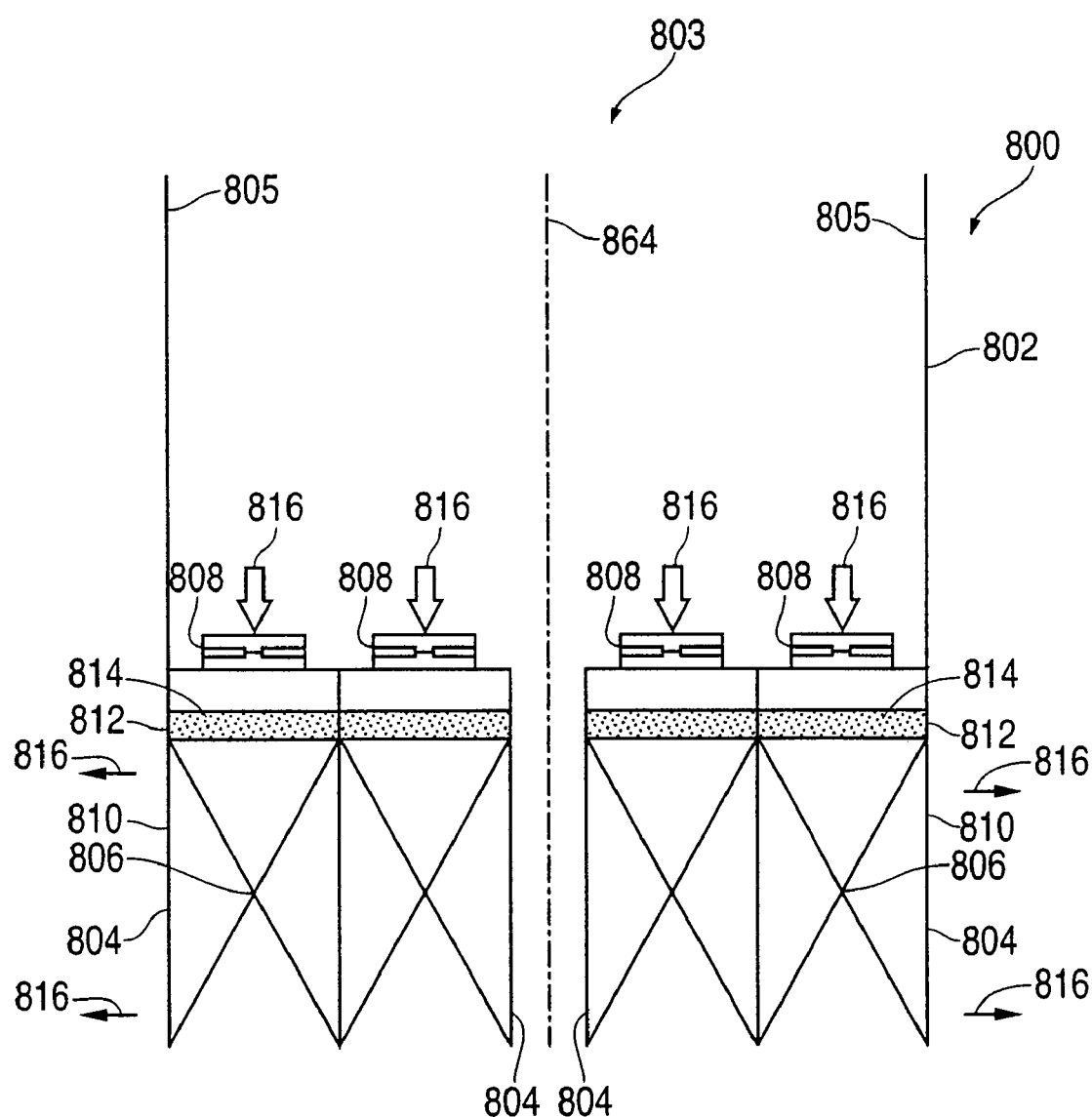
FIG. 12 is a schematic side sectional view of a heating tower in accordance with yet another embodiment of the present invention.

Referring now to FIG. 12, a transverse sectional view of a heating tower, generally designated 800, is illustrated in accordance with another embodiment of the present invention. As depicted in FIG. 12, the heating tower includes an air inlet housing, duct or shell 802 that defines an air inlet 803 and a vertical axis 864. Similar to the heating tower configuration depicted in FIGS. 1-3, the heating tower 800 includes a plurality of individual heating tower cells 804 that are connected to the air inlet duct 802. While FIG. 12 illustrates a heating tower 800 that employs four heating tower cells 804, the heating tower 800 may employ a varying number heating tower cells 804 which can generally vary the heating capacity of the heating tower 800.

As depicted in FIG. 12, the air intake duct 802 is preferably rectangular or square in cross-section, however intake ducts of varying geometries and shapes may employed. The air flow inlet duct 802 includes a first set of opposing side walls 805 connected to the heating tower cells 804, wherein the side walls extend from the outer walls of the outer heating tower cells, generally parallel to the heating tower vertical axis 864. The air flow inlet duct also includes a second set of opposing side walls (not pictured) connected to the first set of opposing side walls 805, that extend generally parallel to the heating tower vertical axis 864. The intake duct 802 defines the heating tower 800 air intake 803 and functions to isolate the air inlet from the heating tower outlet, which will be discussed in greater detail below.

Like the embodiments discussed previously in connection with FIGS. 1-3, the heating tower cells 804 utilized in the heating tower 800 are mechanical draft heating tower cells 804 each having a frame assembly or structure 806 connected to the air intake duct 802. The heating tower cells 804 each have a fan stack or shroud 808 connected to the frame assembly 806, each having a an air generator or fan blade assembly disposed therein. The fan stacks or shrouds 808 each define an air inlet for each of the respective heating tower cells 804. The fan blade assembly is rotated by a gear structure which in turn is driven by a motor. The heating tower cells 804 also include air outlets, generally designated 810, positioned along the sides of the frame assembly 806 of the heating tower 800 as indicated in FIG. 12.

As illustrated in FIG. 12, each heating tower cell 804 also includes a heat exchange portion, generally designated 812, that is schematically depicted. The heat exchange portion 812 is oriented in a position that opposes the shroud 808 and fan assembly. In this orientation, the heat exchanger portion 812 directly underlies the air inlets of the heating tower cells and extends at least partway, and preferably all the way, across the width of the heating tower cell.

The heat exchange portions 812 of the respective heating tower cells 804 preferably utilize a series and/or bundle of tubes or serpentine coils 814, through which a fluid to be heated flows, for heat exchange or heat transfer. These coils or tubes 814 may be oriented or positioned in groups, bundles and/or packs, and some or all of the tubes may have fins attached thereto to help facilitate heat exchange or heat transfer.

During operation of the heating tower 800, the liquid to be heated flows through the heat exchange portion 812 and through the tubes or coils 814. As the liquid to be heated flows through the heat exchange portion 812, air enters the air inlet duct 802 through the inlet 803. The air proceeds to flow through the air inlet duct 812 where it enters each respective fan stack or shroud 808 as indicated by the arrows, 816. As the air flows through the respective shrouds or fan stacks 808, it proceeds to flow through the respective heat exchange portions 812 where it contacts the tubes or coils 814. As a result of the aforementioned contact with the coils or tubes 814, heat exchange occurs and the air becomes very cool. The cool air then proceeds to exit the heating tower cells 804 through each of their respective outlets 810, as indicated by the arrows 816.

During operation of the heating tower 800 as described above, the air inlet duct 802 is positioned such that it extends vertically away from the respective fan stacks 808 and respective outlets 810 of the heating tower cells 804. This positioning of the air inlet duct 802 functions to help isolate the flow of air into the inlet 803 from the outlet flow of cool air exiting the respective outlets 810 of the heating tower cells 804. The aforementioned positioning or orientation of the inlet air duct 802 with respect to the heating tower cell 804 outlets 810 helps to reduce the occurrence of recirculation. More specifically, this orientation helps to reduce the occurrence of the cool air exiting the outlets 810 and re-entering the heating tower 800 through the inlet 803.

Figure 13:
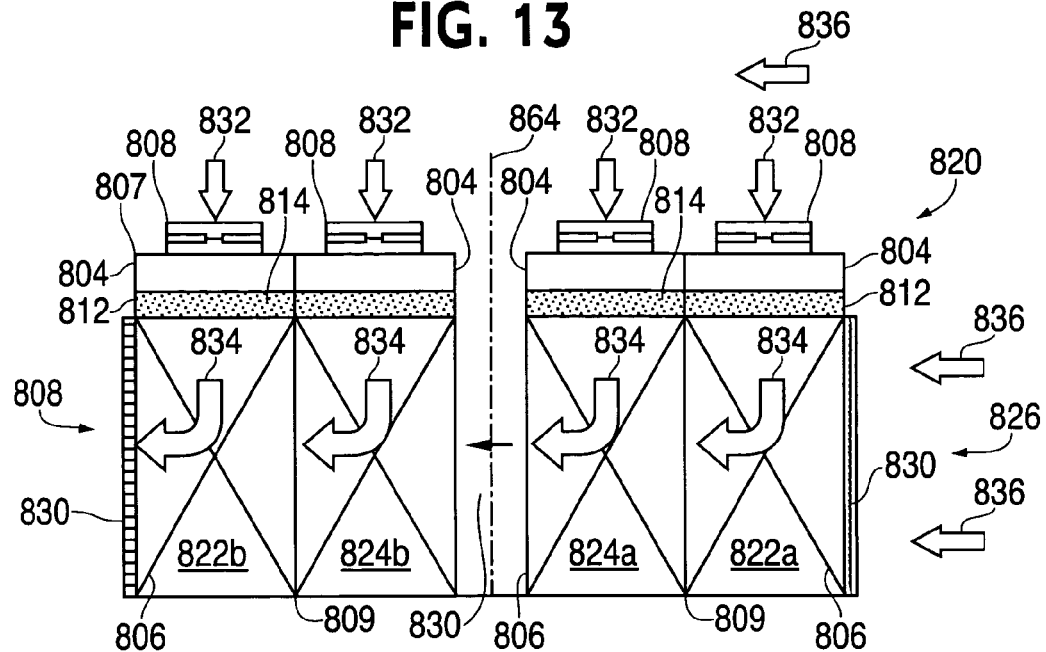
FIG. 13 is a transverse sectional view of heating tower in accordance with another embodiment of the present invention.
Figure 14:
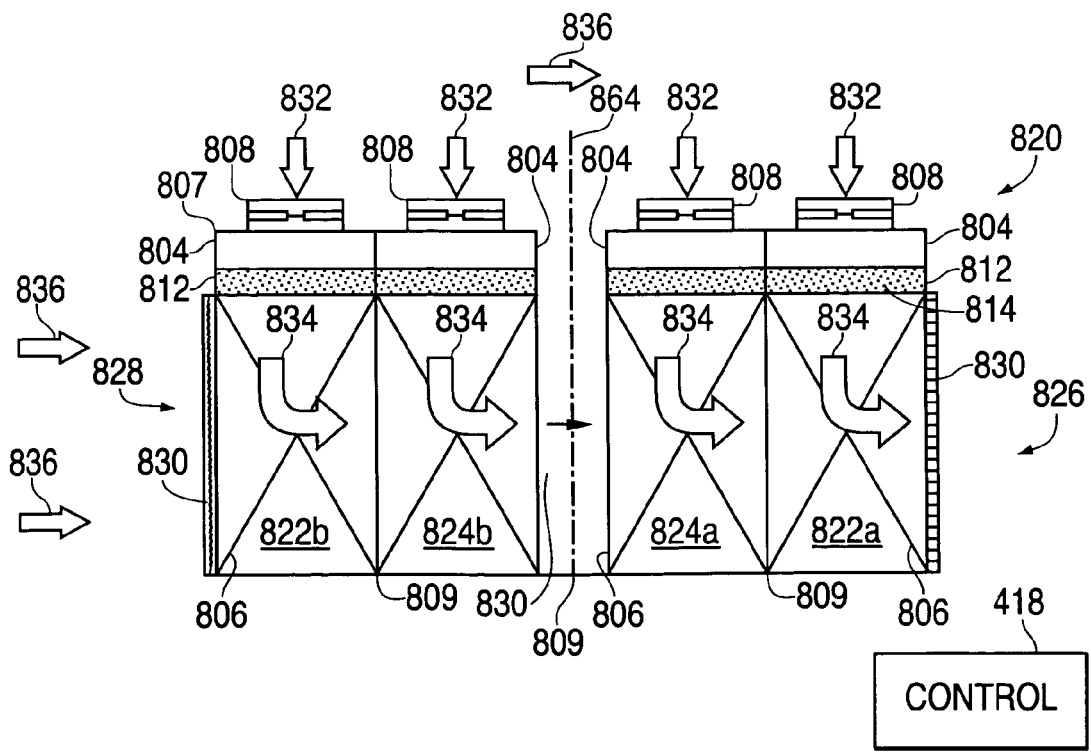
FIG. 14 is a transverse sectional view the heating tower depicted in FIG. 13 in an alternate configuration.

Referring now to FIGS. 13 and 14, a schematic transverse sectional view of a wind adaptation heating tower, generally designated 820, is depicted in accordance with another embodiment of the present invention. As illustrated in FIGS. 13 and 14, the heating tower configuration depicted in FIGS. 13 and 14 has outer or external heating tower cells 822*a, b* and interior or internal heating tower cells 824*a, b*. The interior heating tower cells 824*a, b* do not include an air outlet 826, 828, which will be discussed in further detail below, and are positioned directly adjacent the (optional) interior space 830 while the exterior heating tower cells each include the a heating tower outlets 826, 828.

Like the embodiment previously described in connection with FIG. 12, the heating tower cells 822*a, b*, 824*a, b* are mechanical draft heating tower cells each having a frame assembly or structure 806, top portion 807 and base 809. The heating tower cells 804 each have a fan stack or shroud 808 connected to the frame assembly 806, each having an air generator or fan blade assembly disposed therein. The fan stacks or shrouds 808 each define an air inlet for each of the respective heating tower cells 804. The fan blade assembly is rotated by a gear structure which in turn is driven by a motor.

As illustrated in FIGS. 13 and 14, the heating tower cells 804 also include opposing first and second air flow outlets, generally designated 826 and 828, respectively. However, whereas the air flow outlets 810 in the embodiment depicted in FIG. 12 extend the along the base of each respective heating tower cells 804, the air flow outlets 826, 828 extend at least partially all the way between the top portion 807 and the base 809. Furthermore, whereas the base portions provide an outlet for air flow in the embodiment depicted in FIG. 12, the base portions 809 of the embodiment depicted in FIGS. 13 and 14 do not provide an outlet for air flow. While only two airflow outlets 826, 828 are illustrated on the exterior heating tower cells 822, the exterior heating tower cells 822 may include multiple air flow outlets, similar to the ones depicted, on all of the exterior walls of the exterior heating tower cells 822*a, b*, for example.

As illustrated in FIGS. 13 and 14, each heating tower cell 822, 824 also includes a heat exchange portion, generally designated 812, that is schematically depicted. The heat exchange portion 812 is oriented in a position that opposes the shroud 808. Accordingly, due to this orientation, the heat exchanger portion 812 directly underlies the air inlets of the heating tower cells 822, 824 and extends at least partially across the entire width of the heating tower cells 822, 824.

The heat exchange portions 812 utilize a series and/or bundle of tubes or serpentine coils 814, through which a fluid to be heated flows, for heat exchange or heat transfer. These coils or tubes 814 may be oriented or positioned in groups, bundles and/or packs, and some or all of the tubes may have fins attached thereto to help facilitate heat exchange or heat transfer.

As depicted in FIGS. 13 and 14, each respective air flow outlet 826, 828 extends substantially all the way from the heat exchange portion 812 to the base 809 of the heating tower cell 822. Each of the air outlets 826, 828 include louvered dampers, generally designated 830, that may be transitioned between a opened position and a closed position which will be discussed in further detail below. Alternatively, folding doors, roll-up doors, swinging doors or shutters and fabric curtains or like may be used in lieu of the illustrated louvered dampers 830.

Referring now to FIG. 13, during operation of the heating tower 820, the liquid to be heated flows into the heat exchange portion 812 and through the tubes or coils 814. As the liquid to be heated flows through the heat exchange portion 812 of the heating tower cells 822, 824, air enters each respective heating tower cell 822, 824 through each respective fan stack or shroud 808 as indicated by the arrows 832. As the air flows through the respective shrouds or fan stacks 808, it proceeds to the respective heat exchange portions 812 where it contacts the tubes or coils 814. As a result of the aforementioned contact with the coils or tubes 814, heat exchange occurs and the air becomes very cool. As indicated by the arrows 834, the cool air or effluent exits the heat exchange portion of the cells 822a, 822b, 824a, 824b. As the cool effluent exits cell 822a, it flows into cell 824a via a flow path. The cool air streams then proceed to flow from the interior heating tower cell 824a through the interior space 830 and into interior cell 824b via a flow path. The cool air then proceeds to exit the heating tower 820 through exterior cell 822b through the airflow outlet 828.

As illustrated in FIG. 13, the louvered dampers 830 of the first air flow outlet 826 are closed while the louvered dampers 830 of the second air flow outlet 828 are open. Therefore, upon exiting each of the respective heat exchange sections 812 of the heating tower cells 822a, 822b, 824a, 824b as previously described, the cool air proceeds to exit the heating tower 820 through the second air outlet 828.

During operation of the heating tower 820, the first and second air flow outlet 828, in combination with the louvered dampers 830, function to help isolate the flow of cool air of effluent from the inlet air flow 832 entering each of the respective fans stacks or shrouds 808. For example, when wind conditions are present wherein the wind flow is generally in the direction of the of the first air flow outlet 826, as indicated by the arrows 836, the cool air effluent exits the heating tower 820 via the second air flow outlet 828 as previously described above in connection with FIG. 13. In this configuration, the cool effluent is prevented from exiting the first air flow exit because louvered dampers 830 are closed. The cool effluent is therefore forced or directed to exit via the second air flow outlet 828 as previously discussed. As a result of the cool effluent exiting the outlet 828, the effluents exits the tower in the generally same direction as the wind flow direction 836, reducing the likelihood that recirculation will occur. More specifically, the utilization of the second air flow outlet 828 in combination with closing the louvered dampers 830 located on the first air flow outlet 826, reduces the occurrence of the effluent from exiting the respective heating tower cells 822, 824 and re-entering the respective cells 822, 824 through their respective fan stacks or shrouds 808.

Referring to FIGS. 13 and 14, also during operation, the heating tower 820 may operate using an alternative configuration than that illustrated in FIG. 13, for example in conditions where the wind flow direction is opposite that depicted in FIG. 13. During these conditions wherein the wind flow is generally toward the second airflow outlet 826, as illustrated by the arrows 836 in FIG. 14, the louvered dampers 830 on the first inlet 826 are in the open position while the dampers 830 on the second outlet 828 are in the closed position. While in this configuration, the air flows similar to that described in connection with the configuration depicted in FIG. 13, i.e., through the respective shrouds or fan stacks 808, it proceeds to the respective heat exchange portions 812 where it contacts the tubes or coils 814. As a result of the aforementioned contact with the coils or tubes 814, heat exchange occurs and the air becomes very cool. As indicated by the arrows 834, cool air or effluent exits the heat exchange portion of each of the respective cells 822, 824. However, as indicated by the arrows 834, in the configuration illustrated in FIG. 14, the cool air effluent exits the heat exchange portion of the cell 822b and flows into cell 824b via a flow path. The cool air streams then proceed to flow from the interior heating tower cell 824b through the interior space 830 and into interior cell 824a via a flow path. The cool air then proceeds to exit the heating tower 820 through exterior cell 822a through the first airflow outlet 826.

Contrary to the configuration depicted in FIG. 13, the louvered dampers 830 of the first air flow outlet 826 are opened while the louvered dampers 830 of the second air flow outlet 828 are closed. Therefore, upon exiting each of the respective heat exchange sections 812 of the heating tower cells 822a, 822b, 824a and 824b, the cool air or effluent now proceeds to exit the heating tower 820 through the first air outlet 826.

Like the configuration depicted in FIG. 13, the first and second air flow outlet 826, 828, in combination with the louvered dampers 830, function to help isolate flow of cool air of effluent from the inlet air flow 832 entering each of the respective fans stacks or shrouds 808. For example, when wind conditions are present wherein the wind flow is generally in the direction of the of the second air flow outlet 828, as indicated by the arrows 836 in FIG. 14, the cool air or effluent exits the heating tower 820 via the first air flow outlet 826. In this configuration, the cool air or effluent is prevented from exiting the second air flow outlet 828 because the louvered dampers 830 are closed. The cool air or effluent is therefore forced or directed to exit via the first air flow outlet 826. The cool air or effluent therefore exits the heating tower 820 generally in the same direction as the wind flow direction 836, reducing the likelihood that recirculation will occur. More specifically, the utilization of the first air flow outlet 826 in combination with closing the louvered dampers 830 located on the second air flow outlet 828, reduces the occurrence of the effluent from exiting the respective heating tower cells 822, 824 and re-entering the respective cells 822, 824 through their respective fan stacks or shrouds 808.

The dampers 830 are actuated between the open and closed positions by mechanical actuators. The actuators can be operated by a control 418 which allows the heating tower cell 820 operator to select or designate which outlet 826, 828 to open or close during tower operation, for example in response to atmospheric conditions such as wind direction. Also, the controller may include a sensing means that senses the atmospheric conditions or changes in the atmospheric conditions, and automatically changes the configuration of the heating tower 820 by opening and closing the air flow outlets accordingly.

Figure 15:
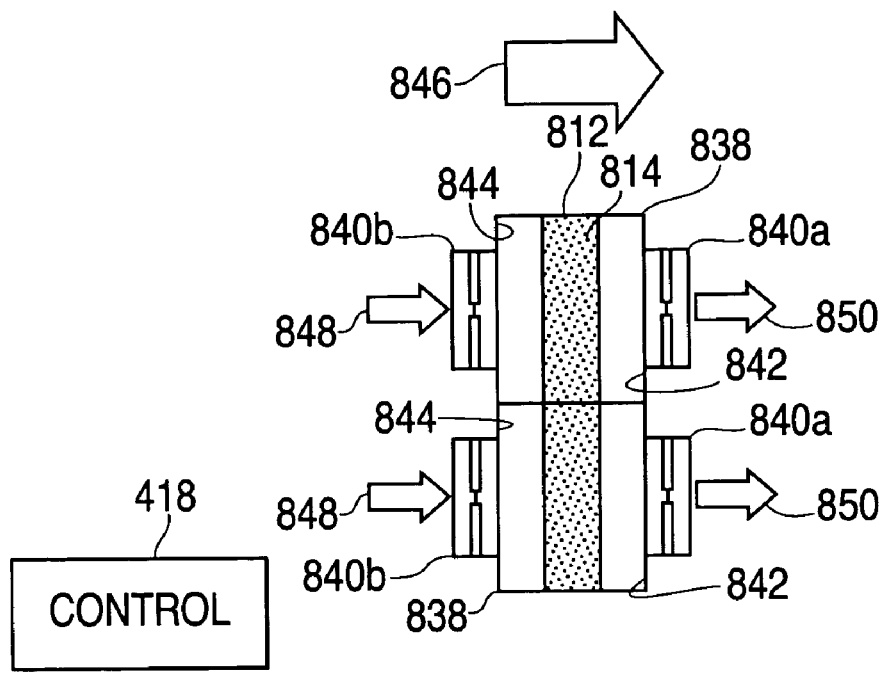
FIG. 15 is an elevation view of a transverse section of a heating tower in accordance with an embodiment of the present invention.
Figure 16:
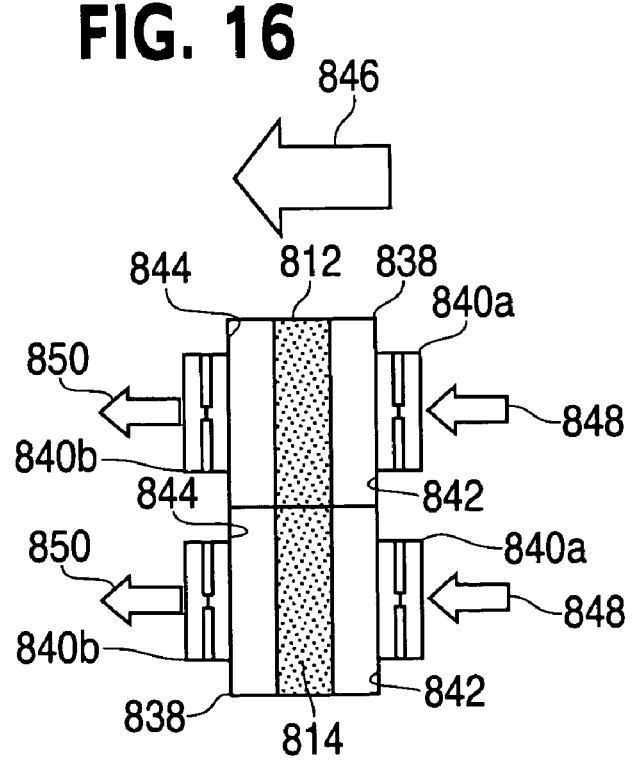
FIG. 16 is an elevation view of the heating tower depicted in FIG. 15 in an alternate configuration.

Referring now to FIGS. 15 and 16, a transverse elevational view of heating tower cells, generally designated 838, that are capable of adapting to atmospheric conditions such as wind direction, are depicted. The heating tower cells 838 are similar to those depicted in FIGS. 13 and 14. However, whereas the embodiment depicted in FIGS. 13 and 14 utilized louvered dampers, the heating tower cells 838 utilize opposing first and second air generators assemblies generally designated 840*a*, 840*b*.

The heating tower cells 838 are mechanical draft heating tower cells each having a heat exchange portion 812. Like the previously described embodiments, the heat exchange portions 812 utilize a series or bundle of tubes or serpentine coils 814, through which a fluid to be heated flows, for heat exchange or heat transfer. These coils or tubes 814 may be oriented or positioned in groups, bundles and/or packs, and some or all of the tubes may have fins attached thereto to help facilitate heat exchange or heat transfer.

As previously mentioned, the heating tower cells 838 each have first and second air generators assemblies 840*a*, 840*b*, each including a fan stack or shroud. The first air generator is connected to a first side wall 842 and the second air generator is connected to a second side wall 844 that opposes the first side wall 842. As illustrated in FIGS. 15 and 16, the opposing first and second air generators 840*a*, 840 bare positioned such that the heat exchange portion 812 extends there between. Whereas the first air generators 840*a* operate to draw air flow through the heating tower cells 838 in a first direction and discharge the air in the first direction, the second air generators 840*b* operate to draw air flow through the heating tower cells 838 in a second, opposite direction and discharge in the second opposite direction. The aforementioned opposing or reverse direction of air flows produced by the first and second air flow generators 840*a*, 840*b* enables the heating tower cells 838 to adapt to varying atmospheric conditions such as wind conditions.

For example, as illustrated in FIG. 15, the wind flow is generally in the direction toward the second air flow generators 840*b* as indicated by the arrows 846. During the above-described operation, the heating tower cells 838 may be operated in a first configuration that, during operation, the first air flow generators 840*a* are operational while the second air generators 840*b* are idle. By first configuration, it is understood that the first air flow generators 840*a* are functioning to draw air through the heating tower cells 838 while the second air generators 840*b* are idle and provide an air flow inlet.

Accordingly, as depicted in FIG. 15, during operation in the first configuration, the second air flow generators 840*b* provide an air flow inlet and the first air flow generators 840*a* function to draw air into the heating tower cells 838 through the second air flow generators 840*b*, as indicated by the arrows 848. As the air is drawn into the heating tower cells 838, it flows through the respective heat exchange portions 812 where heat exchange occurs as previously discussed in connection with embodiments illustrated in FIGS. 12-14. As the cool effluent exits the heat exchange portions 812, the effluent exits the heating tower cells 838 via the first air flow generators 840*a* as illustrated by the arrows 850.

The aforementioned heating tower cell 838 configuration functions to help isolate the flow of cool air effluent from the air flowing into the heating tower cells 838 by drawing air into the cells 838 through the idle second air generators 840*b*, i.e., air inlets, and discharging the cool effluent in the direction of the wind flow 846. This configuration with the first air generators 840*a* drafting air through the cells while the second 840*b* are idle, reduces the occurrence of recirculation. More specifically, this configuration allows the cool air or effluent to be discharge in the direction of the wind, reducing the likelihood of the heating tower effluent from exiting the heating tower cells 838 and re-entering the cells through the second air generators 840*b*.

Referring now to FIG. 16, the heating tower cells 038 may be operated in a second configuration opposite the first discussed above in connection with FIG. 15. During operation while in the first configuration, the first air flow generators are idle while the second air generators 840*b* are operational. By second configuration, it is understood that the second air flow generators 840*b* are now functioning to draw air through the heating tower cells 838 while the first flow air generators 840*a* are idle and function to provide an air flow inlet.

Accordingly, as depicted in FIG. 16, during operation of the heating tower cells 838 while in the second configuration, the first air flow generators 840*a* provide an air flow inlet and the second air flow generators 840*b* function to draw air into the heating tower cells through the first air flow generators 840*b* as indicated by the arrows 848. As the air is drawn into the heating tower cells 838, it flows through the respective heat exchange portions 812 where heat exchange occurs as previously discussed in connection with embodiments illustrated in FIGS. 12-14. As the cool air or effluent exits the heat exchange portions 812, it exits the heating tower cells 838 via the first air flow generators 840*a* as illustrated by the arrows 850.

Again, the aforementioned second configuration functions to help isolate flow of cool air or effluent from the air flowing into the heating tower cells 838 by drawing air into the cells 838 through the idle first air generators 840*a*, i.e., air inlets, and discharging the cool air effluent in the direction of the wind flow 846, through the second air flow generators 840*b*. This configuration, with the second air generators 840*b* drafting air through the cells 838 while the first generators 840*a* are idle, reduces the occurrence of recirculation. More specifically, this configuration allows the cool effluent to be discharged in the direction of the wind, reducing the likelihood of the heating tower effluent from exiting the heating tower cells 838 through the outlets and re-entering the cells through the inlets.

Like the previously discussed embodiments, the opposing first and second air flow generators 840*a*, 840*b* may be switched between the operational and idle positions via a control 418 which allows the operator to select between the first and second heating tower cell configurations. Alternatively, the controller may include a sensing means that senses the atmospheric conditions, or changes in the atmospheric conditions, and automatically changes the configuration of the heating tower cell between the first and second configurations, accordingly.

Figure 17:
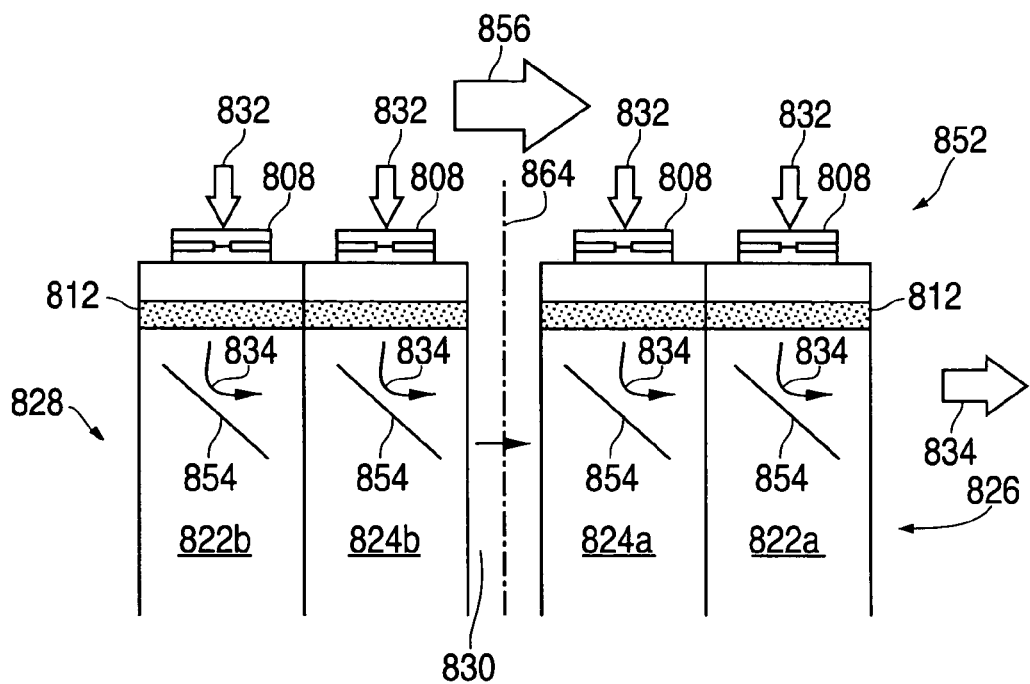
FIG. 17 is a transverse sectional view of heating tower in accordance with another embodiment of the present invention.
Figure 18:
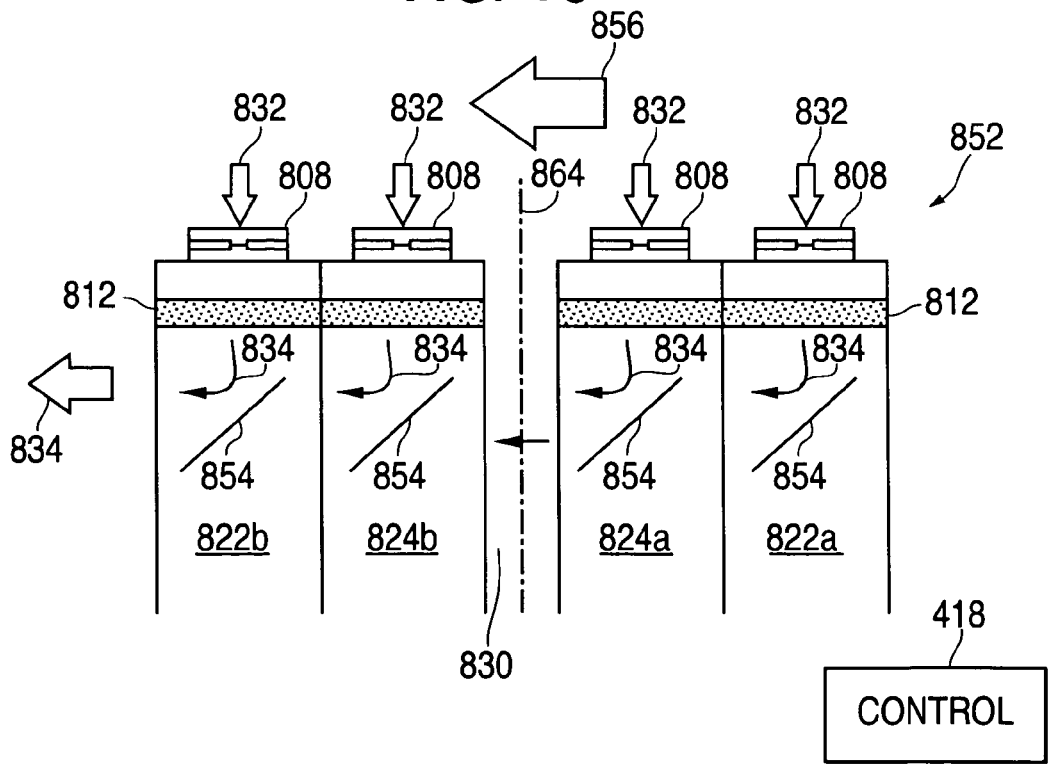
FIG. 18 is a transverse sectional view of heating tower depicted in FIG. 17 in an alternate configuration.

Referring now to FIGS. 17 and 18, a transverse sectional view of a heating tower is illustrated, generally designated 852, in accordance with yet another embodiment of the present invention. In the embodiment depicted, the heating tower 852 includes four heating tower cells 822, 824, however additional or less cells may be utilized. The illustrated heating tower 852 embodiment is able to adapt to atmospheric conditions such as wind direction, similar to the embodiment previously disclosed and described in connection with FIGS. 13 and 14. However, instead of mechanically actuated louvers, the embodiment depicted in FIGS. 17 and 18 utilizes turning vanes 854 which are located directly under the heat exchange portions 812. Alternatively, the heating tower 852 may utilize a series of small turning vanes instead of the those depicted.

Accordingly, referring now to FIG. 17, when atmospheric conditions exist having wind conditions, for example, flowing in a first direction as indicated by the arrow 856, the heating tower 852 operates in a first configuration. By first configuration, it is understood that the turning vanes 854 are rotated in a first direction to a first position toward the first air flow outlet 826. During operation while in this first configuration, air is drawn into the individual heating tower cells 822, 824 via the shrouds 808, as previously discussed in connection with the embodiment depicted in FIGS. 13 and 14. As the cool air or effluent exits each of the heat exchange portions 812 of the respective heating tower cells 822, 824, the cool effluent contacts the turning vanes 854. As illustrated by the arrows 834, as the cool air or effluent contacts the vanes 854 where it is deflected or forced in the direction of the first air flow outlet 826. Accordingly, the effluent exiting individual heating tower cells 822a, 822b, 824a, 824b is deflected or forced, by the respective vanes 854, toward the first air flow outlet 826, where the effluent exits the heating tower 852 in the direction of the wind.

Like the louvered dampers 830 of the embodiment illustrated in FIGS. 13 and 14, the positioning of the turning vanes 854 function to isolate the flow of air into the inlets or shrouds 808 from the flow of cool air or effluent 834 exiting the first outlet 826. This orientation of the turning vanes 854 helps to discharge the effluent with the wind and reduce the likelihood of recirculation occurring.

Referring now to FIG. 18, when atmospheric conditions exist having wind conditions, for example, flowing in a second opposite direction, as indicated by the arrow 856, the heating tower 852 may operate in a second configuration. By second configuration, it is understood that the turning vanes 854 are rotated to a second position, toward the second air flow outlet 828. During operation while in the aforementioned second configuration, air is drawn into the individual heating tower cells 822, 824 via the shrouds 808, as previously discussed in connection with the embodiments depicted in FIGS. 13 and 14. As the cool air or effluent exits each of the heat exchange sections 812 of the respective heating tower cells 822, 824, the cool air or effluent contacts the turning vanes 854 which are now rotated toward the second air flow outlet 828. As illustrated by the arrows 834, as the effluent contacts the vanes 854, it is deflected or forced in the direction of the second air flow outlet 828. Accordingly, the effluent exiting individual heating tower cells 822a, 822b, 824a, 824b is deflected or forced, by the respective vanes 854, toward the second air flow outlet 828, where the effluent exits the heating tower 852 in the direction of the wind.

Again, the positioning of the turning vanes 854 functions to isolate the flow of air into the inlets or shrouds 808 from the flow of cool air or effluent 834 exiting the second outlet 826. This orientation of the turning vanes 854 helps to discharge the effluent with the wind and reduce the likelihood of recirculation occurring.

The turning vanes 854 may be rotated between the first position and the second position or via actuators using the control 418. The control 418 allows the heating tower operator to select or designate which position the turning vanes 854, first or second, are oriented during heating tower 852 operation, for example, in response to wind direction. Also, the controller 418 may include a sensing means that senses the atmospheric conditions, or changes in atmospheric conditions, and automatically rotates the turning vanes 854, accordingly, to the first or second position.

Figure 19:
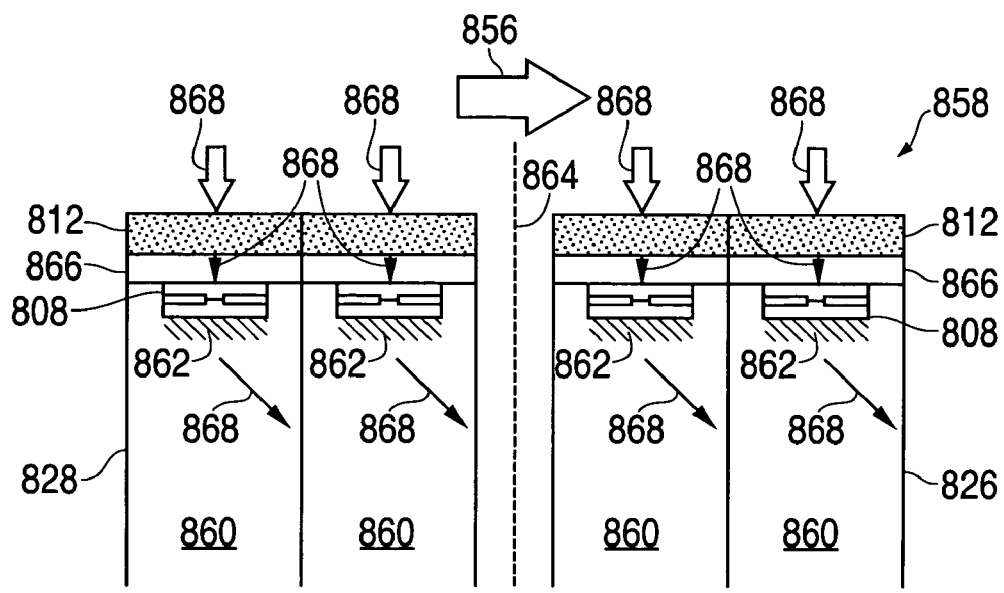
FIG. 19 is a transverse sectional view of a heating tower in accordance with still another embodiment of the present invention.
Figure 20:
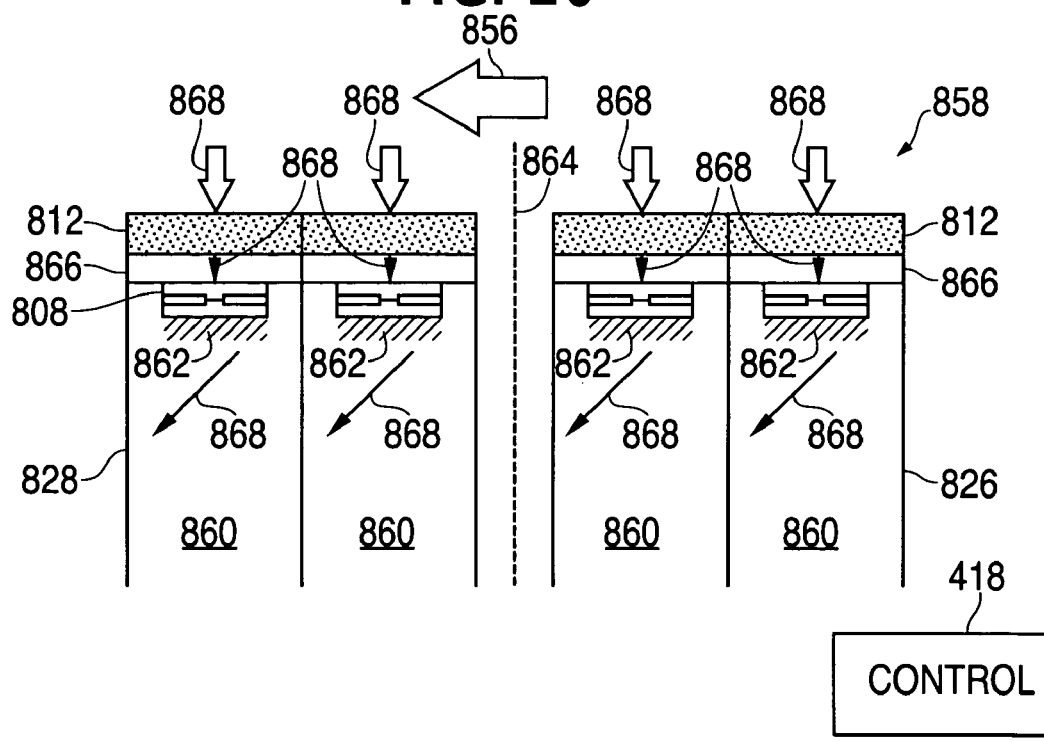
FIG. 20 is a transverse sectional view of the heating tower depicted in FIG. 19 in an alternative configuration.

Turning now to FIGS. 19 and 20, a transverse sectional view of a heating tower, generally designated 858, having four individual heating tower cells 860 is depicted. While FIGS. 19 and 20 illustrate four cross-sectional views of the heating tower cells 860, the heating tower 858 may utilize more or less heating tower cells depending upon the desired and/or required heat transfer capacity of the heating tower 858.

The heating tower 858, like the embodiment illustrated in FIGS. 17 and 18, is able adapt to atmospheric conditions such as wind direction wherein each of the heating tower cells 860 has turning vanes, generally designated 862. However, whereas the embodiment illustrated in FIGS. 17 and 18 is a forced draft heating tower 852, the embodiment depicted in FIGS. 19 and 20 is a mechanically, induced draft heating tower wherein each of the heating tower cells 860 are induced draft cells.

As illustrated in FIGS. 19 and 20, the heating tower cells 860 each have a fan stack or shroud 808 along with an air flow generator disposed therein and a heat exchange portion 812, similar to that describe above in connection with previously disclosed embodiments. However, due to the heating tower's 858, and the respective heating tower cell's, "induced configuration," the heat exchange potion 812 is positioned above the fan stack or shroud 808 verses below, as is the orientation in the previous disclosed embodiments. More particularly, as illustrated in FIGS. 19 and 20, the heat exchange portion 812 of the heating tower cells 860 is positioned at a first axial location along the vertical axis 864 of the heating tower 858, wherein the fan stack or shroud 808 of the heating tower cells 860 is located a second axial location thereof, below the heat exchange portion 812. The heating tower cells 860 also include a sealed area or space 866 located at third axial location along the vertical axis, between the heat exchange portion 812 and the fan stack or shroud 808.

As mentioned above, each of the heating tower cells 860 has a series or set of turning vanes 862 connected to the fan stacks or shrouds 808, as depicted in FIGS. 19 and 20. The turning vanes 862, like those described in connection with the embodiment depicted in FIGS. 17 and 18, may be rotated between a first position and a second position in response to atmospheric conditions such as wind direction. FIG. 19 depicts the turning vanes 462 in the first position wherein FIG. 20 depicts the vanes 862 in the second position.

The turning vanes 862 may be rotated between the first position and the second position or via actuators using the control 418. The control 418 allows the heating tower operator to select or designate which position the turning vanes 462, first or second, are oriented during heating tower 858 operation, for example, in response to wind direction. Also, the controller 418 may include a sensing means that senses the atmospheric conditions, or changes in atmospheric conditions, and automatically rotates the turning vanes 862, accordingly, to the first or second position.

Referring now specifically to FIG. 19, when atmospheric conditions exist such as wind conditions, flowing in the direction as indicated by the arrow 856, for example, the heating tower 858 again operates preferably in the first configuration. In the embodiment depicted, like that illustrated in FIG. 17, by first configuration it is understood that the turning vanes 862 are rotated or positioned in the first direction toward the first air flow outlet 826.

During operation while in this first configuration, air is drawn into each of the individual heating tower cells 860 via air current generators in the downward direction as indicated by the arrows 868. Due to the previously described positioning of the heat exchange portion 812, the sealed space 866 and the fan stack or shrouds 808, the downward flow of air initially contacts each of the respective heat exchange portions 812 of the heat tower cells 860 and heat exchange occurs. As the cool air or effluent exits the heat exchange portions 812, it proceeds to flow through the sealed space 866 where it is then drawn through the fan stacks or shrouds 808 as indicated by the arrows 868. The cool effluent is then discharged from the respective fan stacks or shrouds 808 where it contacts the turning vanes 862. As illustrated by the arrows 868, as the cool effluent contacts the turning vanes 862 it is deflected or forced toward the first air flow outlet 826. Accordingly, the cool effluent exiting the individual heating tower cells 860 is deflected or forced by the respective vanes 862 toward and through the first air flow outlet 826 where the effluent exits the heating tower 858 in the direction of the wind.

Referring now to FIG. 20, when atmospheric conditions exist having wind conditions, for example, flowing in a second opposite direction, as indicated by the arrow 856, the heating tower 858 operates in a second configuration. In the embodiment depicted, like that illustrated in FIG. 18, by second configuration it is understood that the turning vanes 862 are rotated or positioned in the second direction toward the second air flow outlet 828.

During operation while in the second configuration, air is drawn into each of the individual heating tower cells 860 via air current generators in the downward direction as indicated by the arrows 868. Due to the previously described positioning of the heat exchange portion 812, the sealed space 866 and the fan stack or shrouds 808, the downward flow of air initially contacts the respective heat exchange portions 812 of the heat tower cells 860 and heat exchange occurs. As the cool effluent exits the heat exchange portions 812, it proceed to flow through the sealed space 866 where it is then drawn through the fan stacks or shrouds 808 as indicated by the arrows 868. The cool effluent is then discharged from the respective fan stacks or shrouds 808 where it contacts the turning vanes 862. As illustrated by the arrows 868, as the cool effluent contacts the turning vanes 862 it is now deflected or forced toward the second air flow outlet 828. Accordingly, the cool effluent exiting the individual heating tower cells 860 is deflected or forced by the respective vanes 862 toward and through the second air flow outlet 828 where the effluent exits the heating tower 858 in the direction of the wind.

Again, the positioning of the turning vanes 862 functions to isolate the flow of air into the respective heating tower cells 860 from the flow of effluent 834 exiting the first outlet 826. This orientation of the turning vanes 854 helps to discharge the effluent with the wind direction and reduce the likelihood of recirculation occurring.

The turning vanes 862 are operated using the control 418. The control 418 allows the heating tower operator to rotate the turning vanes 862 between the first position and the second position during heating tower operation. Again, similar to the previously described embodiments, the controller 418 may include a sensing means that senses the atmospheric conditions, that automatically rotates the turning vanes 862 between the to the first position or the second position.

Referring now to FIGS. 21 and 22, a transverse sectional view of a heating tower, generally designated 870, having four individual heating tower cells 872, is depicted. While FIGS. 21 and 22 illustrate four cross-sectional views of the heating tower cells 872, the heating tower 870 may utilize more or less heating tower cells 872 depending upon the desired or required heat transfer capacity of the heating tower 870.

The heating tower 870, like the embodiment illustrated in FIGS. 13 and 14, is able adapt to atmospheric conditions such as wind direction. However, whereas the embodiment illustrated in FIGS. 13 and 14 utilizes louvered dampers 830, or the like, to adapt to atmospheric conditions, the heating tower embodiment 870 depicted in FIGS. 21 and 22 utilizes reverse direction of air flow to adapt to such conditions. By "reverse direction of air flow" it is understood that each of the heating tower cells 872 has a fan stack or shroud 808 similar to the previous embodiments, however as illustrated in FIGS. 21 and 22, the heating tower cells have dual fan assemblies comprising a first upper fan 874 and a second, lower fan 876. The aforementioned dual fans assemblies 874, 876 enable the heating tower 870 to operate in varying wind conditions and allow the respective heating tower cells 872 utilize an upward air flow in response to wind conditions, or, alternatively, a downward air flow in response to wind conditions.

Accordingly, the heating tower cells 872 are mechanical draft cells that include heat exchange portions 812 connected to a frame assembly or structure 806, similar to the previous described embodiments. The heating tower 870 includes a first outer wall or side, generally designated 878 and a second outer wall or side 880. While the first wall or side 878 is solid or does not permit air flow, the second wall or side 880 provides an air flow path or opening for the heating tower 870. The air flow path extends at least partially between the heat exchange portion 812 and the bottom or base 809 of the heating tower 870 and may extend the entire distance between the heat exchange portion 812 and the base 809.

As previously mentioned, the heating tower cells 872 each have multiple or dual fan assemblies having an upper fan 874 and a lower fan 876. The upper fan 874 functions to provide upward airflow through the respective heating tower cells 872 as depicted by the arrows 882 in FIG. 21. The lower fan 876 alternatively provides a downward airflow as indicted by the arrows 884 in FIG. 22.

The upper and lower fans 874, 876 are operated using the control 418. The control 418 allows the heating tower operator to select or designate which fan, the upper 874 or the lower 876, is to be used during heating tower operation. Again, similar to the previously described embodiments, the controller 418 may include a sensing means that senses the atmospheric conditions, that automatically designates or selects the fan 874, 876 to be used.

Referring now particularly to FIG. 21, when wind conditions exist, for example, wherein has a flow direction is generally toward the second side 880 as indicated by the arrow 886, the heating tower may operate in a first configuration. In this first configuration, the upper fans 874 are operational while the lower fans 876 are idle. Also while in this configuration, the second side 880 provides an airflow inlet. Accordingly, during operation, the upper fans 874 provide an upward airflow as indicated by the arrows 882 wherein the air initial enters the cells via the second side 880. The airflow then proceeds to the respective heating tower cells 872 via airflow paths where it flows upwardly toward the respective heat exchange portions 812 as indicated by the arrows 882. The cool effluent then exits the heat exchange portions 812 and then is discharged from the heating tower cells 872 through the fans stacks or shrouds 808 as indicated by the arrows 882.

Referring now to FIG. 22, when wind conditions exist, for example, wind flow in a second opposite direction 886, the heating tower 870 may operate in a second configuration. In this second configuration, the upper fans 874 are now idle while the lower fans 876 are in operation. Also while in this configuration, the second side 880 now provides an airflow outlet. Accordingly, during operation, the lower fans 874 provide downward airflow as indicated by the arrows 884 wherein the air initially enters the cells via the fan stacks or shrouds 808. The airflow then proceeds to contact each of the respective heat exchange portions 812. The cool effluent then exits the respective heat exchange portions 812 where it flows downwardly toward the airflow opening of the second side 880. The cool effluent is then discharged from the heating tower cells 872 through the through the second side 880 as indicated by the arrows 884.

The utilization of the upper and lower fans 874, 876 helps to isolate the flow of air into the respective heating tower cells 860 from the flow of effluent exiting the heating tower cells 872. The selective operation of the upper fans 874 or lower fans 876 helps to discharge the effluent in a preferred directions, reducing the effects of wind flow and wind direction, and therefore reducing the likelihood of recirculation occurring.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for heating a fluid, comprising:
   receiving the fluid to be heated into a heating tower, the heating tower comprising:
      a vertical axis,
      a frame assembly having opposed side walls that extend generally parallel to the vertical axis and opposing top and bottom end walls that are each connected to, and extend between the side walls;
      a heat exchange section disposed in the frame assembly, wherein the heat exchange assembly comprises a series of coils;
      a fan stack disposed within said top end wall;
      an air inlet duct connected to the top end wall, wherein said air inlet duct extends along the longitudinal axis away from the top end wall;
   passing the inlet air stream over the series of coils;
   imparting heat from the inlet air stream on the fluid to be heated;
   discharging the air stream from the heating tower through an outlet; and
   isolating the inlet air stream from the outlet air stream.

2. The method for heating a fluid according to claim 1, wherein the fan stack is a plurality of fan stacks.

3. The method according to claim 1, wherein said inlet duct comprises:
   a first wall extending from the heating tower generally parallel to the vertical axis;
   a second wall that opposes the first wall, wherein the second wall extends from the heating tower generally parallel to the vertical axis;
   a third wall connected to the first and second walls that extends from the heating tower generally parallel to the vertical axis; and
   a fourth wall connected to the first and second walls that extends from the heating tower generally parallel to the vertical axis.

4. The method according to claim 3, wherein the inlet duct has a generally rectangular shaped geometry.

5. The method according to claim 1, wherein the outlet comprises an outlet duct.

6. The method according to claim 3, wherein the method for heating a fluid comprises a plurality of mechanical draft heating tower cells, each comprising:
   a heating tower air flow inlet located at a first axial location thereof;
   a heat exchange portion comprising the series of coils mounted to a frame at a second axial location thereof below the first position; and
   an air flow outlet positioned at a third axial location thereof below the second position.

7. The method according to claim 6, wherein the series of coils include fins attached thereto.

* * * * *